United States Patent
Um et al.

(10) Patent No.: US 11,140,690 B2
(45) Date of Patent: Oct. 5, 2021

(54) METHOD AND APPARATUS FOR TRANSMITTING SIGNAL IN UNLICENSED BAND COMMUNICATION SYSTEM, METHOD AND APPARATUS FOR SCHEDULING UPLINK, AND METHOD AND APPARATUS FOR TRANSMITTING INFORMATION ABOUT CHANNEL STATE MEASUREMENT SECTION

(71) Applicant: Electronics And Telecommunications Research Institute, Daejeon (KR)

(72) Inventors: Jung Sun Um, Daejeon (KR); Hoiyoon Jung, Daejeon (KR); Sungjin Yoo, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/771,362

(22) PCT Filed: Jan. 26, 2017

(86) PCT No.: PCT/KR2017/000954
§ 371 (c)(1),
(2) Date: Apr. 26, 2018

(87) PCT Pub. No.: WO2017/131465
PCT Pub. Date: Aug. 3, 2017

(65) Prior Publication Data
US 2018/0317244 A1    Nov. 1, 2018

(30) Foreign Application Priority Data

Jan. 29, 2016 (KR) .......................... 10-2016-0011786
Mar. 17, 2016 (KR) .......................... 10-2016-0032240
(Continued)

(51) Int. Cl.
*H04W 72/12* (2009.01)
*H04W 72/04* (2009.01)
(Continued)

(52) U.S. Cl.
CPC ......... *H04W 72/1215* (2013.01); *H04L 5/001* (2013.01); *H04L 5/0051* (2013.01);
(Continued)

(58) Field of Classification Search
None
See application file for complete search history.

(56) References Cited

U.S. PATENT DOCUMENTS 10,694,515 B2    6/2020   Zhao et al.
2012/0039273 A1*  2/2012  Nam ..................... H04L 5/0005
                                                    370/329

(Continued)

FOREIGN PATENT DOCUMENTS

CN    103944665 A    7/2014
CN    105208663 A    12/2015
(Continued)

OTHER PUBLICATIONS

ZTE, "Analysis on potential issues and solutions for LAA UL transmission," *Proceedings of the #GPP TSG RAN WG1 Meetings #80*, Athens, Greece, Feb. 2015, pp. 1-6.
(Continued)

*Primary Examiner* — Ruihua Zhang
(74) *Attorney, Agent, or Firm* — NSIP Law

(57) ABSTRACT

A method for transmitting an uplink signal in an unlicensed band by a terminal is provided. The terminal receives first scheduling information that schedules one or more uplink subframes, from a base station in a first downlink subframe. The terminal receives second scheduling information that determines a transmission time point of the uplink signal, (Continued)

from the base station in a second downlink subframe after the first downlink subframe. The terminal transmits the uplink signal in a first uplink subframe corresponding to the transmission time point among the one or more uplink subframes.

8 Claims, 19 Drawing Sheets

(30) Foreign Application Priority Data

| | | |
|---|---|---|
| May 3, 2016 | (KR) | 10-2016-0054577 |
| Aug. 12, 2016 | (KR) | 10-2016-0103161 |
| Jan. 25, 2017 | (KR) | 10-2017-0012229 |

(51) Int. Cl.
| | |
|---|---|
| *H04L 5/00* | (2006.01) |
| *H04L 5/14* | (2006.01) |
| *H04L 27/00* | (2006.01) |
| *H04W 74/08* | (2009.01) |
| *H04W 16/32* | (2009.01) |

(52) U.S. Cl.
CPC .......... *H04L 5/0094* (2013.01); *H04L 5/1469* (2013.01); *H04L 27/0006* (2013.01); *H04W 72/042* (2013.01); *H04W 72/1289* (2013.01); *H04L 5/005* (2013.01); *H04L 5/14* (2013.01); *H04W 16/32* (2013.01); *H04W 74/0808* (2013.01)

(56) References Cited

U.S. PATENT DOCUMENTS

| | | | | |
|---|---|---|---|---|
| 2012/0099520 | A1* | 4/2012 | Kwon | H04B 7/155 |
| | | | | 370/315 |
| 2012/0307782 | A1 | 12/2012 | Kang et al. | |
| 2014/0321338 | A1 | 10/2014 | Park et al. | |
| 2015/0023315 | A1 | 1/2015 | Yerramalli et al. | |
| 2015/0131573 | A1* | 5/2015 | Yoo | H04W 72/1226 |
| | | | | 370/329 |
| 2015/0201431 | A1 | 7/2015 | Um et al. | |
| 2015/0264662 | A1 | 9/2015 | Sahlin et al. | |
| 2018/0054792 | A1* | 2/2018 | Lee | H04L 5/00 |
| 2018/0076946 | A1* | 3/2018 | Li | H04L 5/0053 |
| 2018/0103458 | A1* | 4/2018 | Tooher | H04W 16/14 |
| 2018/0324821 | A1* | 11/2018 | Dai | H04L 5/0094 |
| 2018/0359772 | A1* | 12/2018 | Park | H04W 16/14 |
| 2019/0045505 | A1* | 2/2019 | Yang | H04W 72/1289 |
| 2019/0150170 | A1* | 5/2019 | Park | H04W 72/1268 |
| 2019/0229825 | A1* | 7/2019 | Ahn | H04J 11/0069 |

FOREIGN PATENT DOCUMENTS

| | | |
|---|---|---|
| CN | 105357162 A | 2/2016 |
| KR | 10-2013-0075620 A | 7/2013 |

OTHER PUBLICATIONS

Institute of Information Industry (III), "Discussion of LAA Uplink Transmission," *Proceedings of the 3GPP TSG RAN WG1 Meeting #81*, Fukuoka, Japan, May 2015 (4 pages, in English).
Intel Corporation, "On the LAA UL: LBT, scheduling, and sub-frame structure," *Proceedings of the 3GPP TSG RAN WG1 Meeting #81*, Fukuoka, Japan, May 2015 (4 pages, in English).
Huawei, "Introduction of eLAA into 36.212," *Proceedings of the 3GPP TSG-RAN EG1 Meeting #86*, Gothenburg, Sweden, Aug. 2016 (29 pages, in English).
3GPP, A Global Initiative, "3rd Generation Partnership Project; Technical Specification Group Radio Access Network; Evolved Universal Terrestrial Radio Access (E-UTRA); Multiplexing and channel coding (Release 14)," *3GPP TS* 36.212, v14.0.0, Sep. 2016, pp. 1-148.
3GPP, A Global Initiative, "Random access procedure," *3GPP TS* 36.212, v14.0.0, Sep. 2016, pp. 46-263.
3GPP, A Global Initiative, "14 UE procedures related to Sidelink," *3GPP TS* 36.212, v14.0.0, Sep. 2016, pp. 345-395.
International Search Report dated May 26, 2017, in corresponding International Application No. PCT/KR2017/000954 (3 pages in English, 4 pages in Korean).
"Discussion on multi-subframe scheduling for UL LAA", Samsung, *3GPP TSG RAN WG1 Meeting #84*, St. Julian's, Malta, Feb. 15-19, 2016 (2 pages in English).
"On UL data transmission for eLAA", InterDigital Communications, *3GPP TSG RAN WG1 Meeting #84*, St. Julian's, Malta, Feb. 15-19, 2016 (3 pages in English).
"PUSCH transmission on eLAA carrier",OPPO, *3GPP TSG RAN WG1 Meeting #84*, St. Julian's, Malta, Feb. 15-19, 2016 (3 pages in English).
"SRS transmission for eLAA", Huawei et al., *3GPP TSG RAN WG1 Meeting #84*, St. Julian's, Malta, Feb. 15-19, 2016 (8 pages in English).
"Way Forward on Scheduling in UL subframes", Qualcomm, *3GPP TSG RAN WG1 Meeting #84*, St. Julian's, Malta, Feb. 15-19, 2016 (2 pages in English).
"On LAA UL scheduling and UL grant Enhancements", Nokia et al., *3GPP TSG RAN WG1 Meeting #84bis*, Busan, Republic of Korea, Apr. 11-15, 2016 (9 pages in English).
"Signaling for Flexible Timing UL Scheduling", Intel Corporation, *3GPP TSG RAN WG1 Meeting #84bis*, Busan, Republic of Korea, Apr. 11-15, 2016 (4 pages in English).
"WF on PUSCH/SRS Structure in LAA", LG Electronics, *3GPP TSG RAN WG1 Meeting #84bis*, Busan, Republic of Korea, Apr. 11-15, 2016 (4 pages in English).
Extended European Search Report dated Aug. 9, 2019 in counterpart European Patent Application No. 17744586.3 (13 pages in English).
"3$^{rd}$ Generation Partnership Project; Technical Specification Group Radio Access Network; Evolved Universal Terrestrial Radio Access (E-Ultra); Multiplexing and channel coding (Release 13)", 3GPP TS 36.212 V13.0.0 , 3GPP, Dec. 2015 (121 pages in English).
Chinese Office Action dated Oct. 20, 2020 in counterpart Chinese Patent Application No. 201780003888.6 (9 pages in English and 19 pages in Chinese).
European Office Action dated Oct. 23, 2020 in counterpart European Patent Application No. 17 744 586.3 (8 pages in English).

\* cited by examiner

【Figure 1】
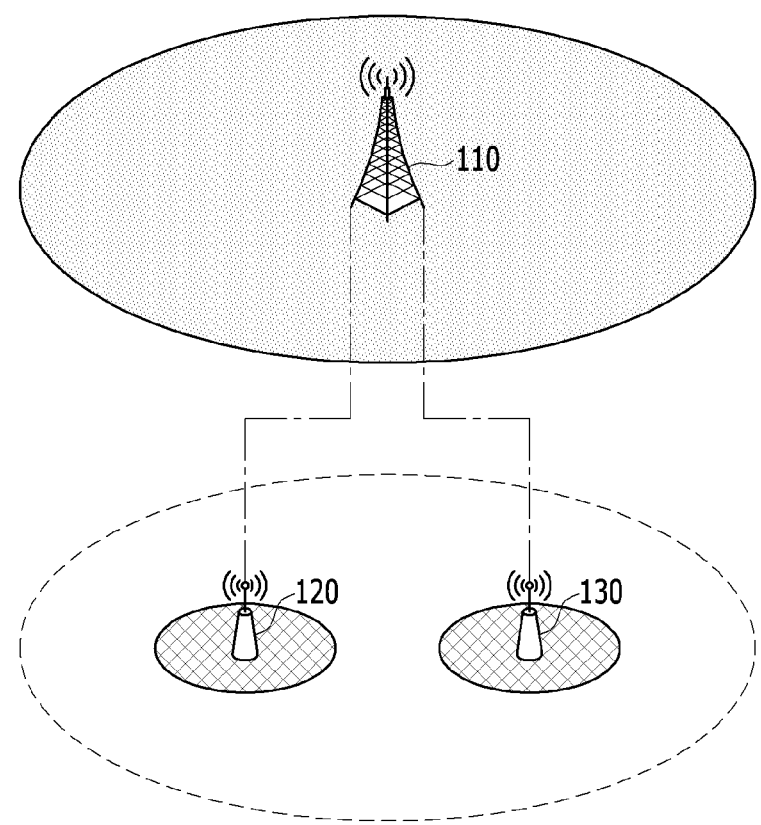

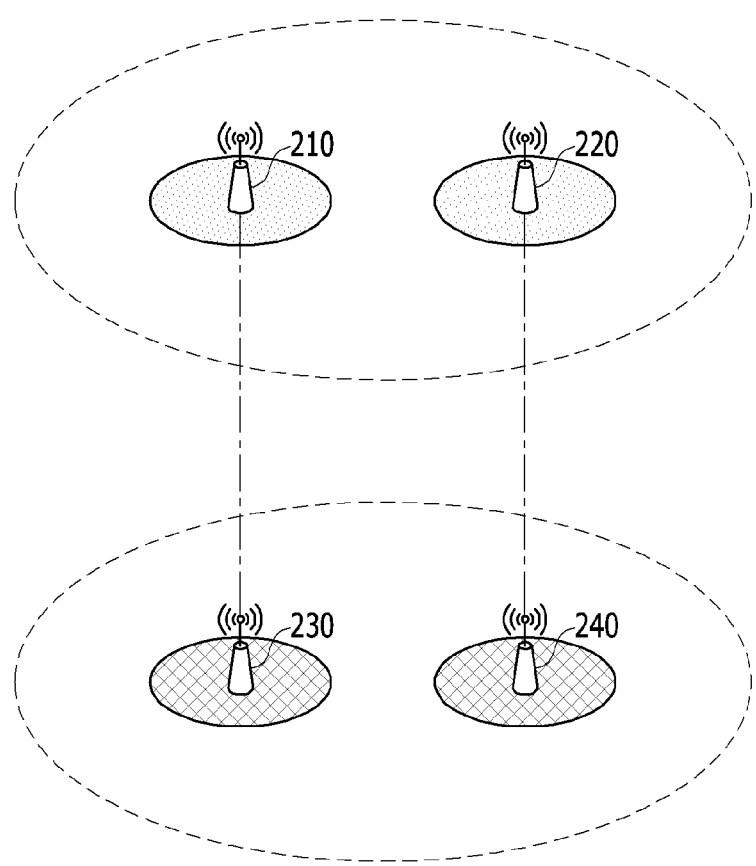
[Figure 2]

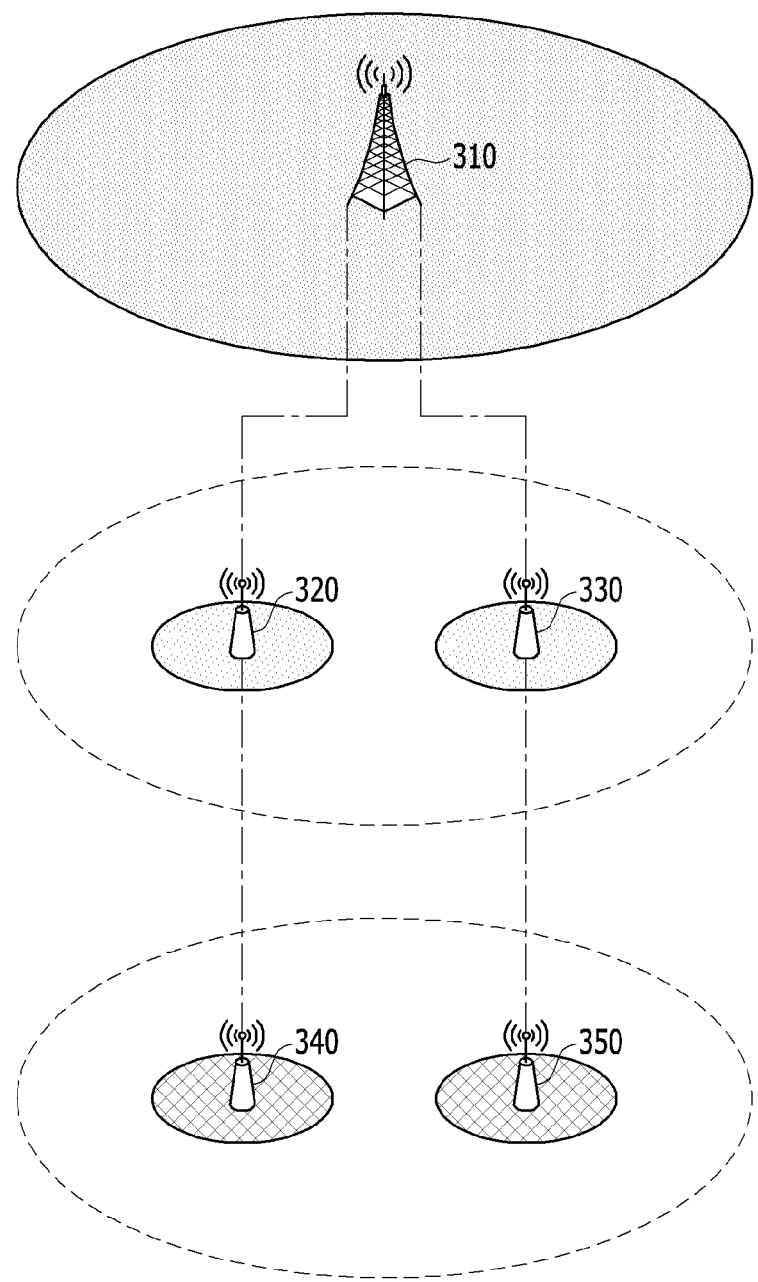
【Figure 3】

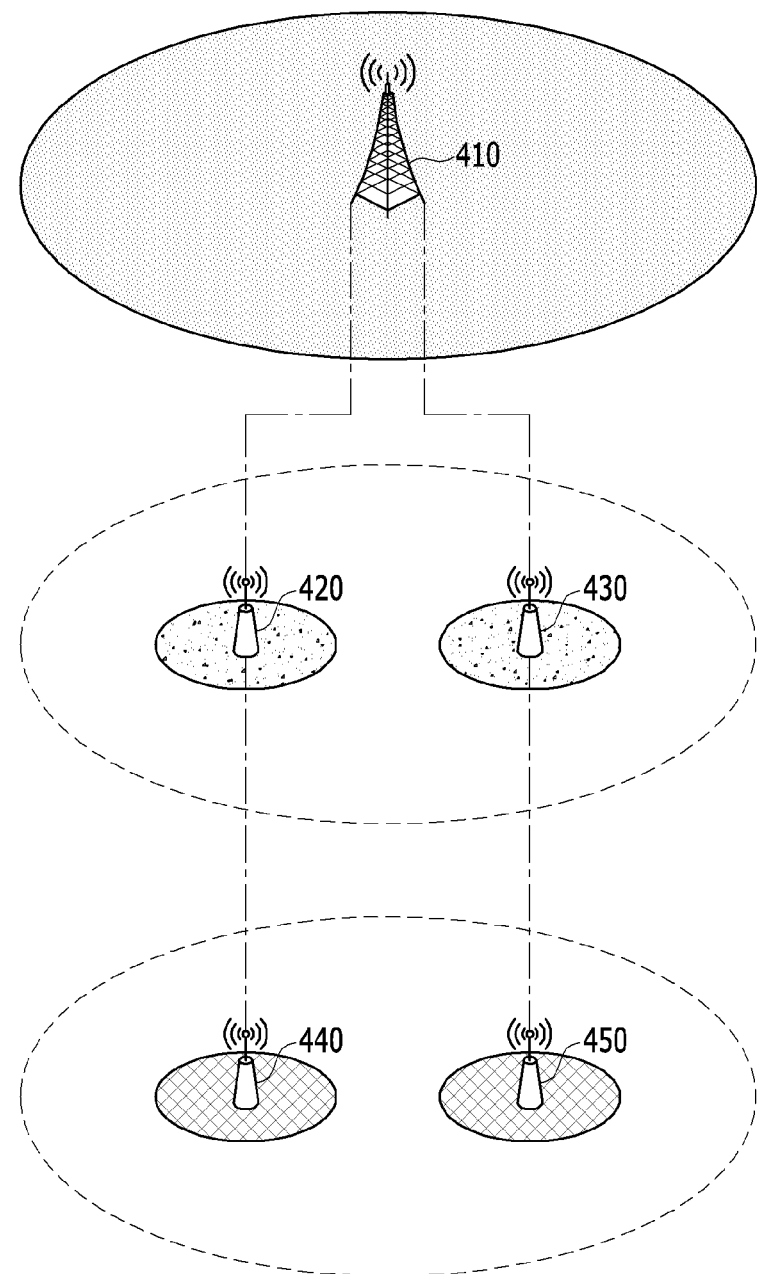
【Figure 4】

[Figure 5]
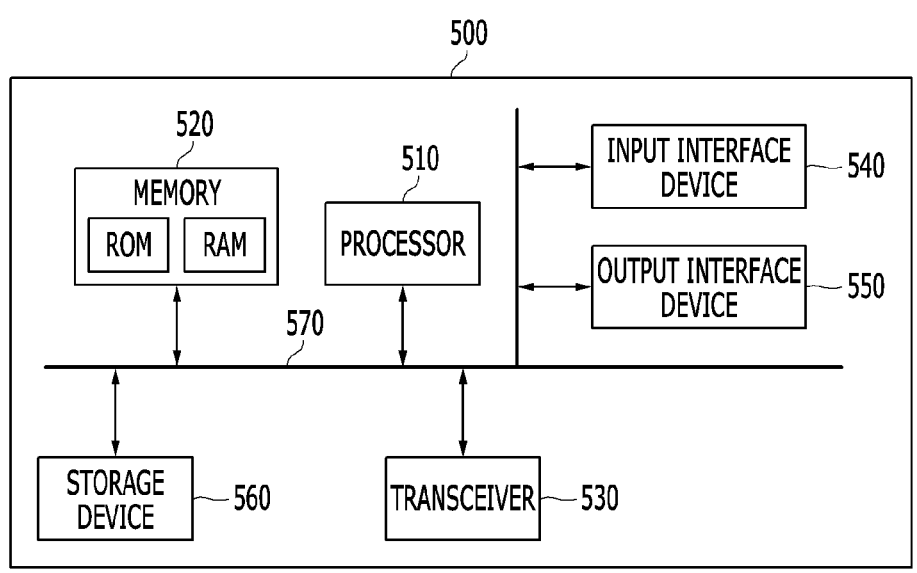

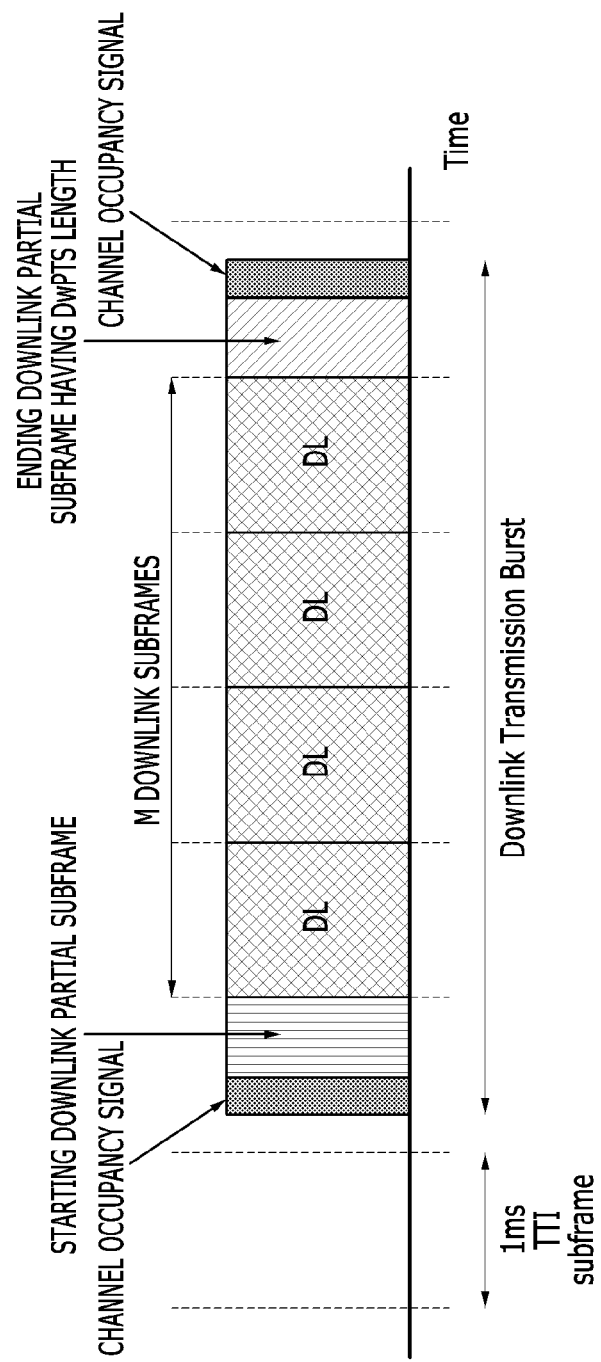
[Figure 6]

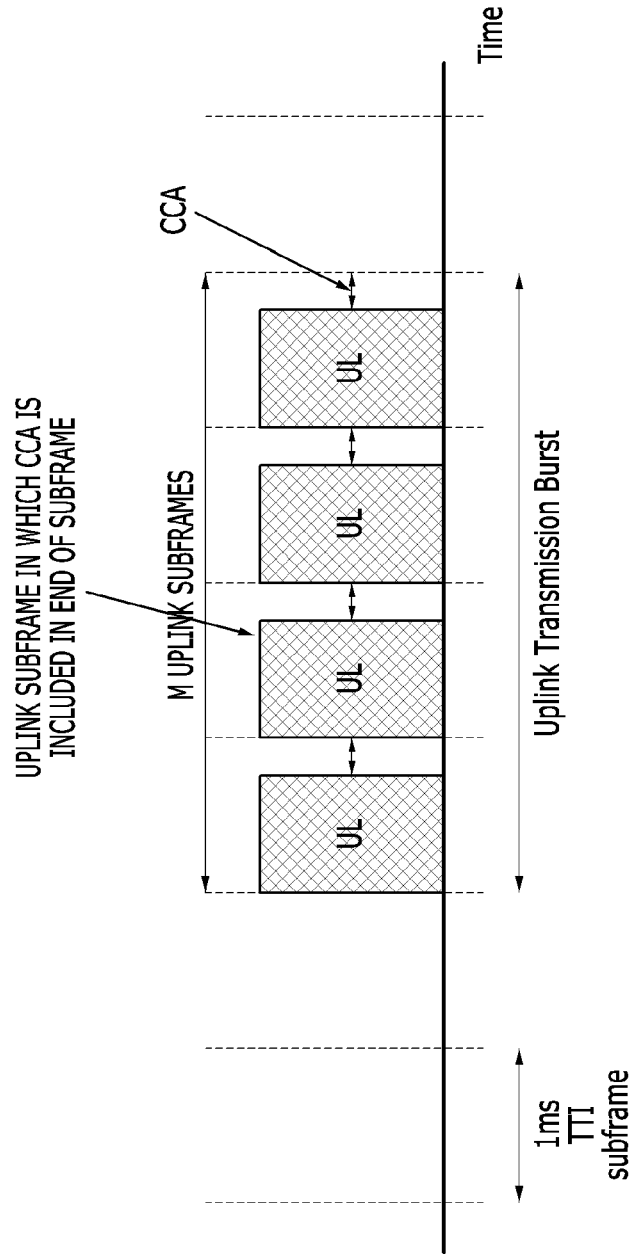
[Figure 7A]

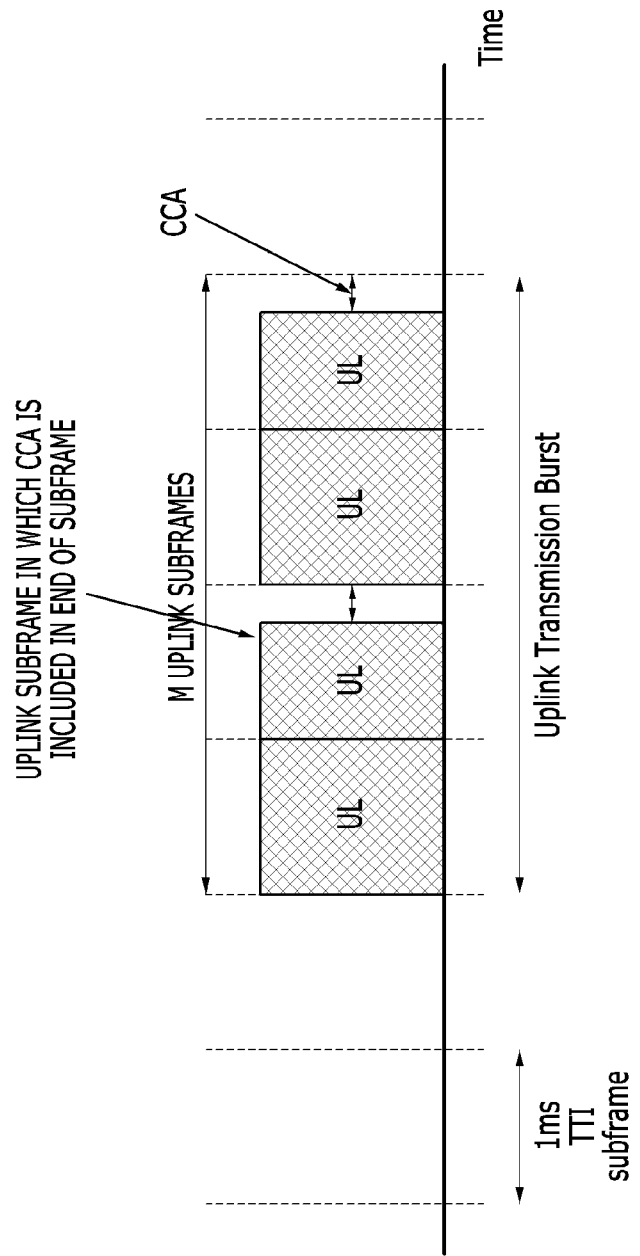
[Figure 7B]

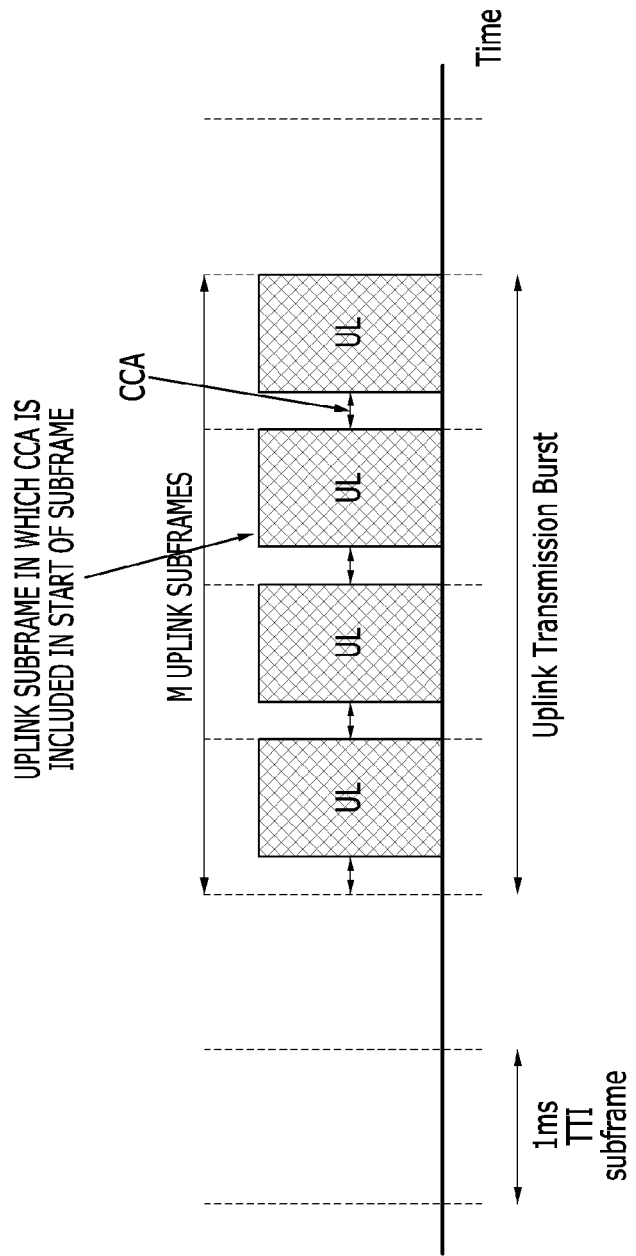
[Figure 7C]

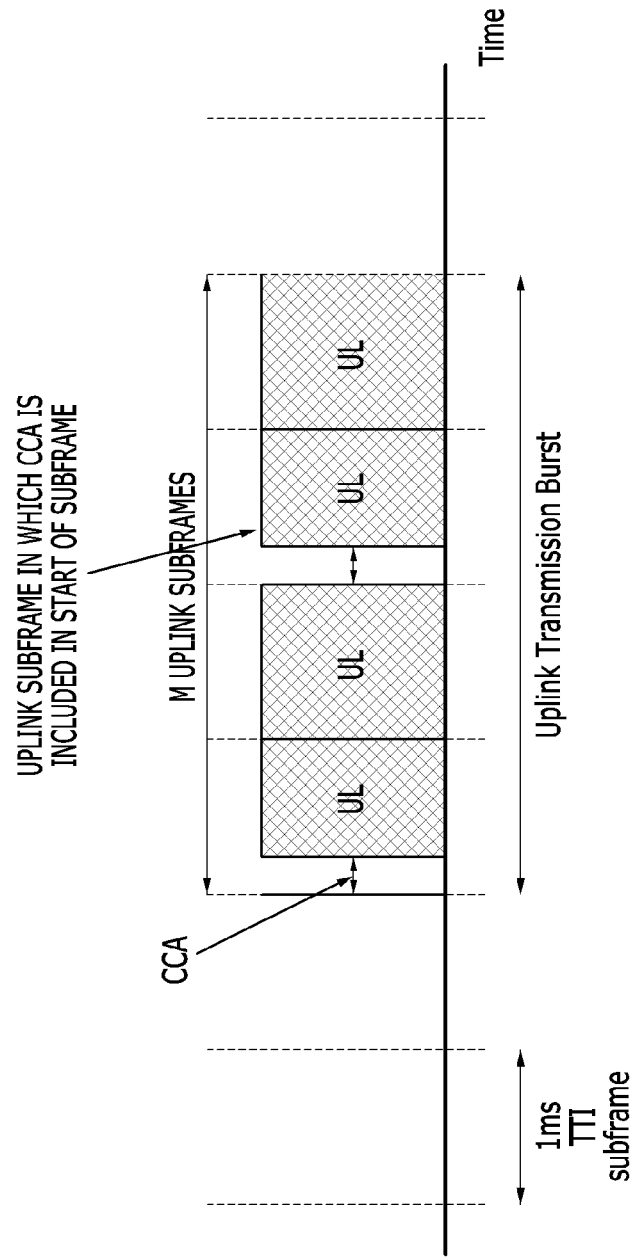
[Figure 7D]

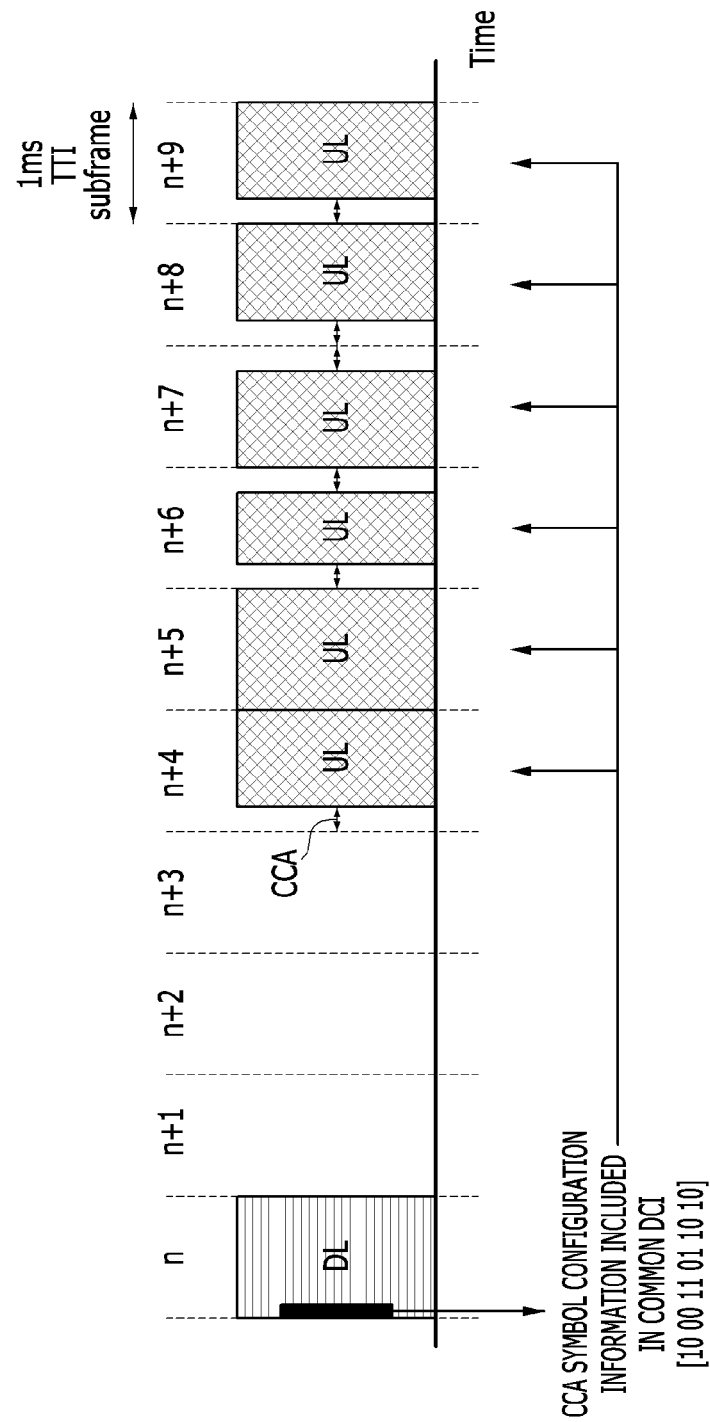

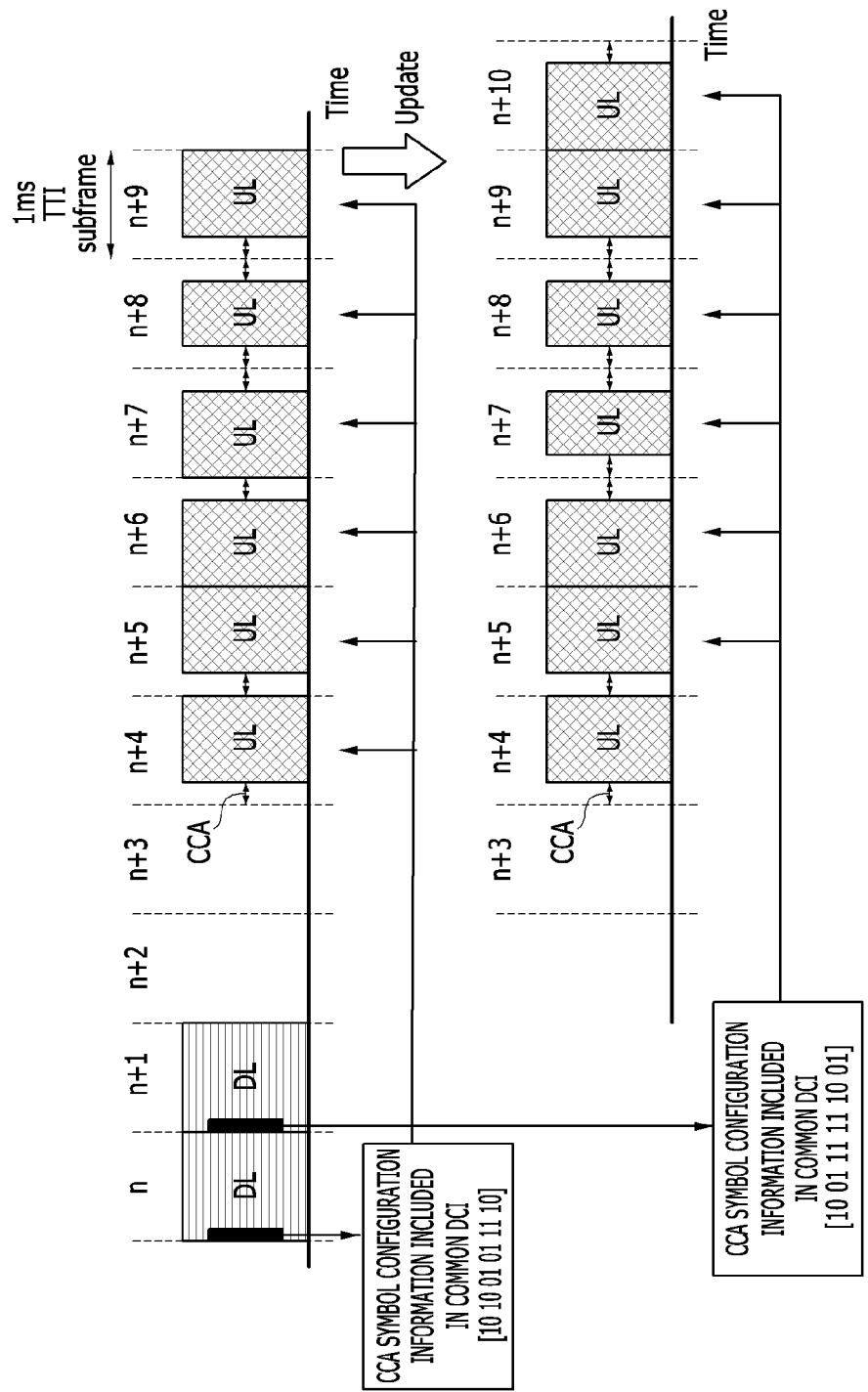
[Figure 9]

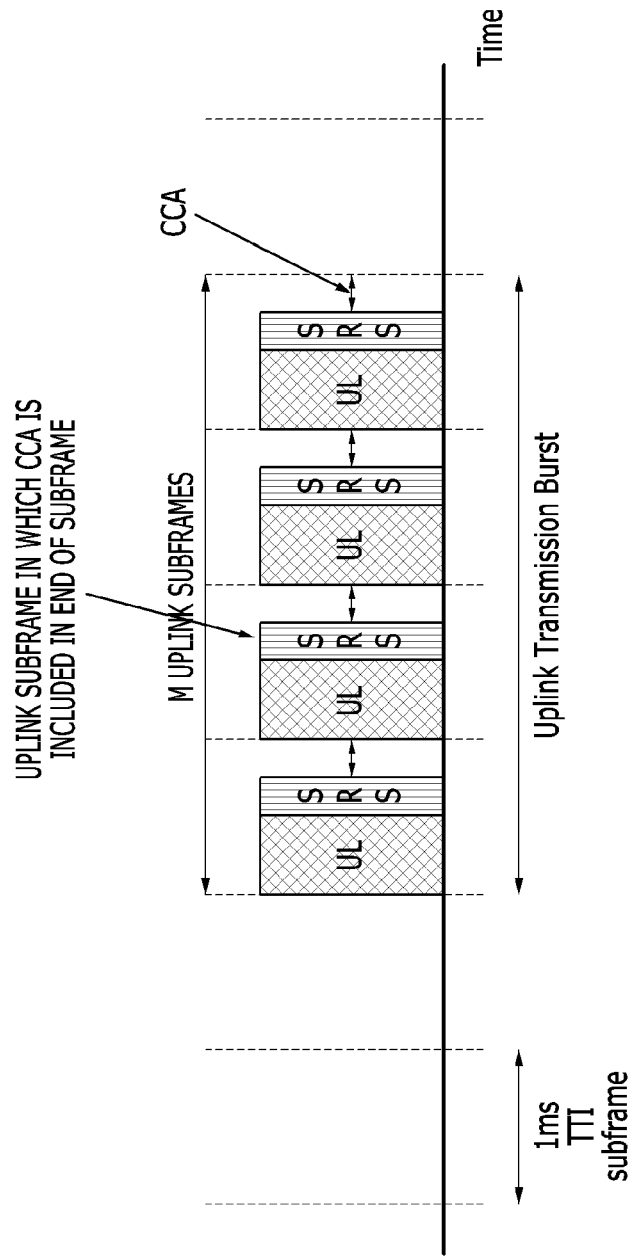
[Figure 10A]

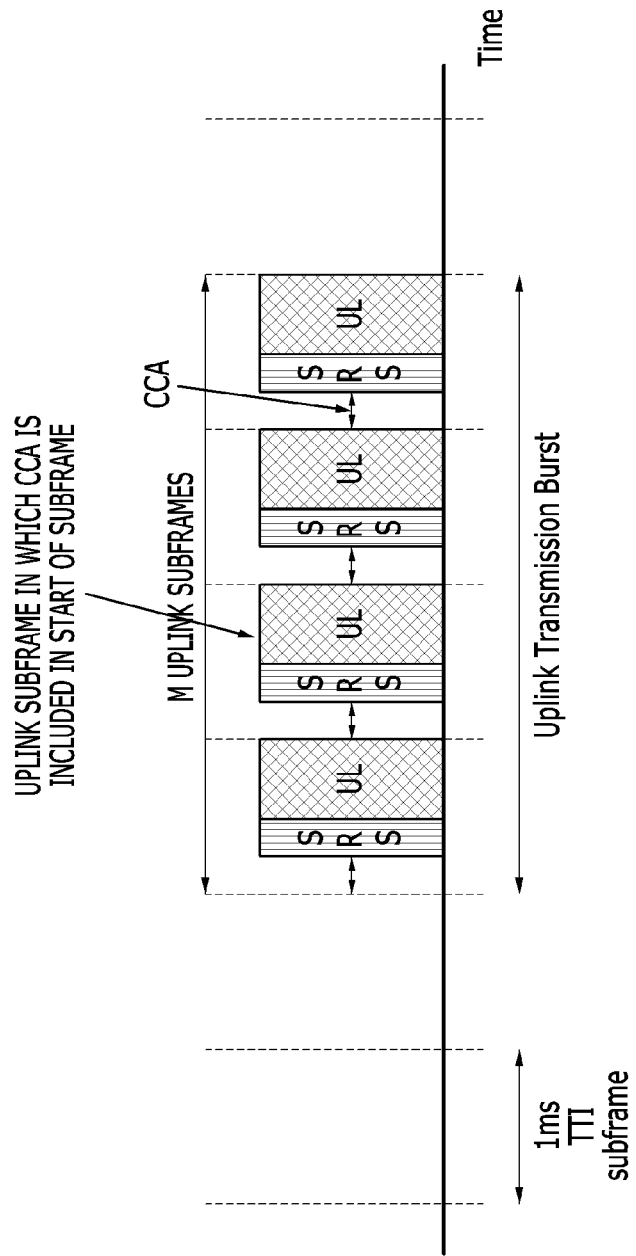
[Figure 10B]

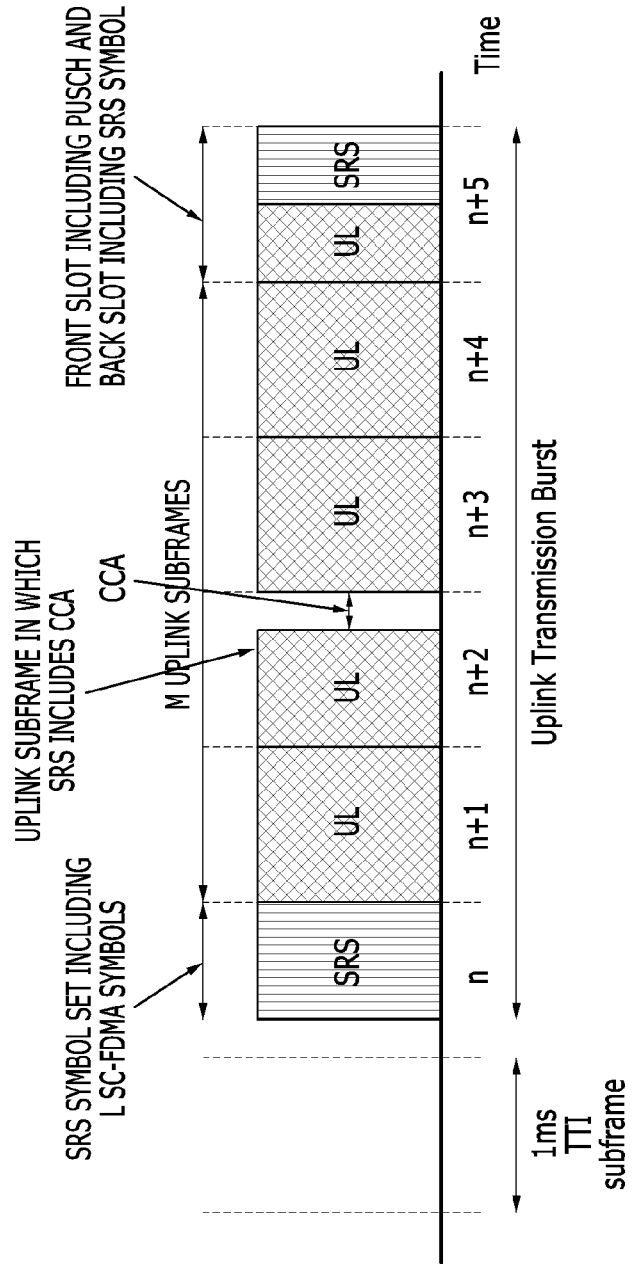
[Figure 11A]

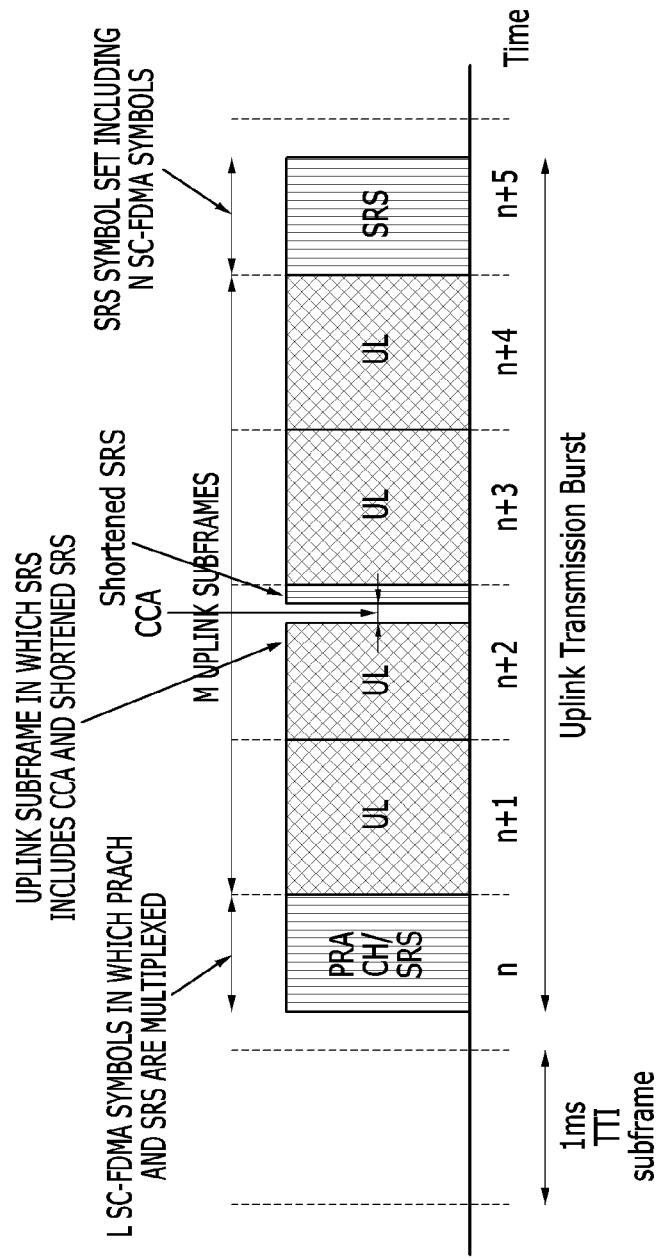
[Figure 11B]

【Figure 12A】
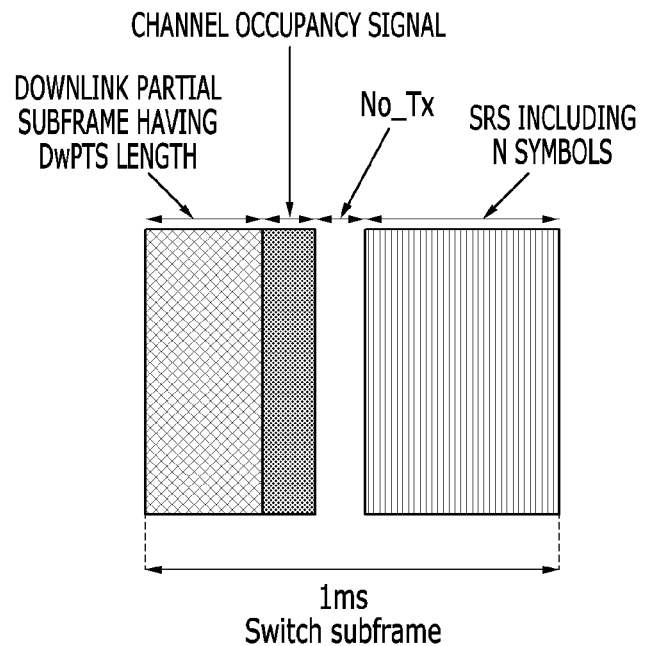
【Figure 12B】
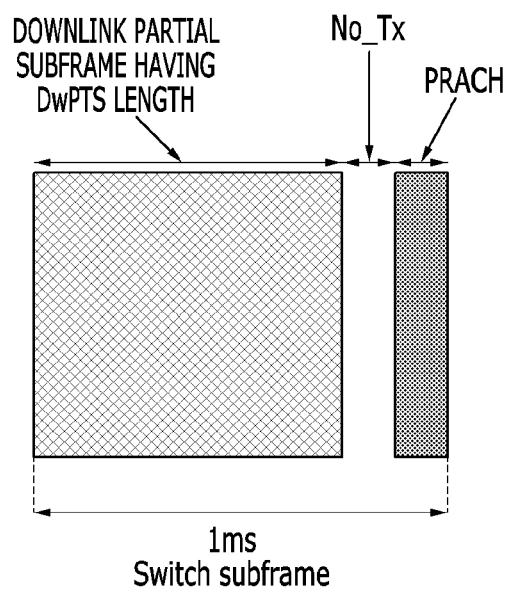

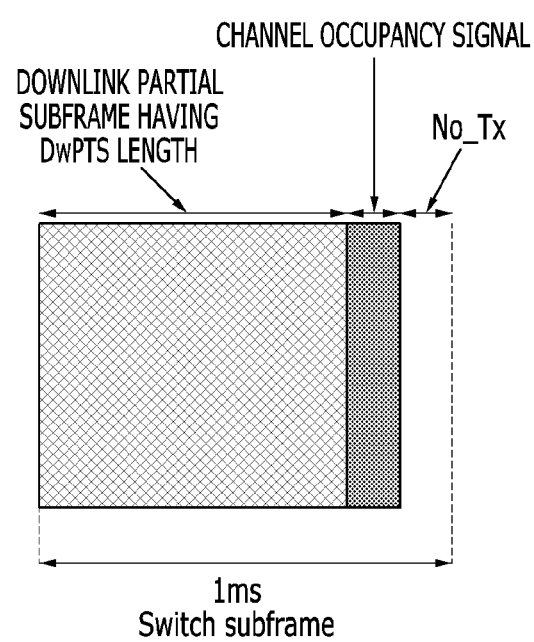
[Figure 12C]

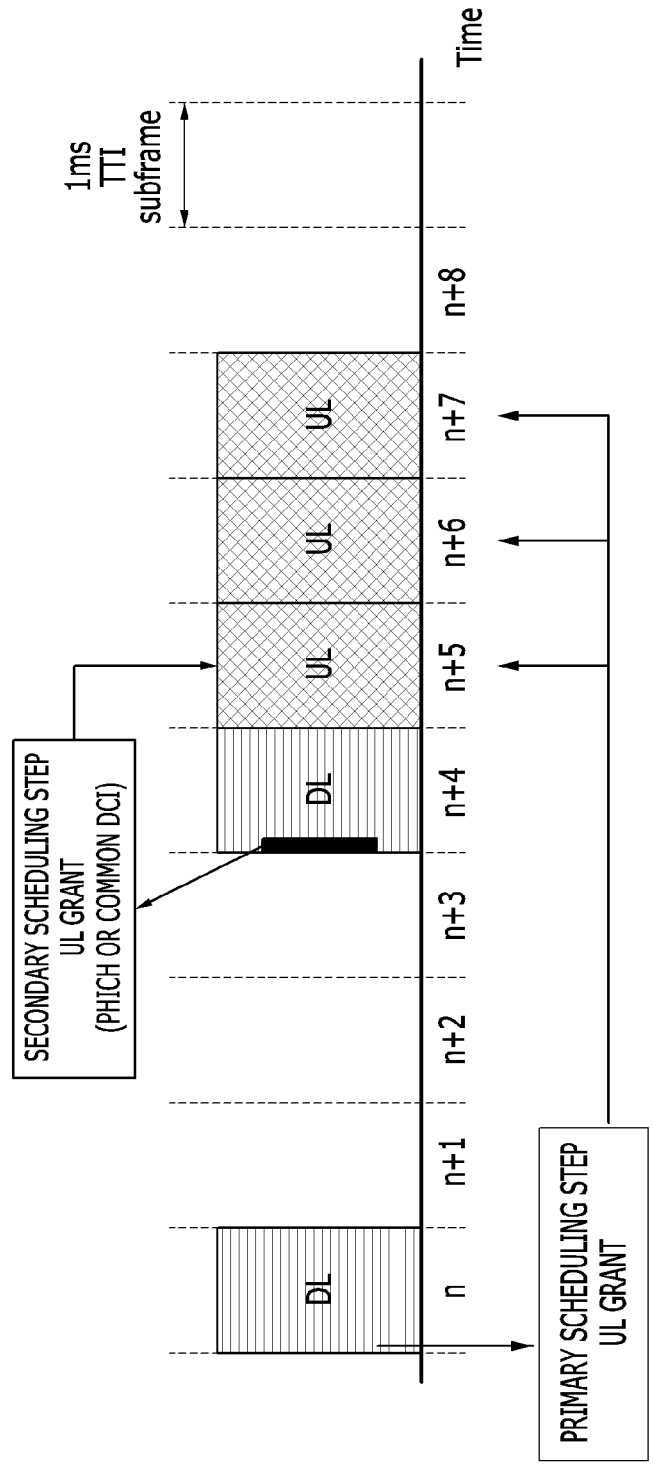

METHOD AND APPARATUS FOR TRANSMITTING SIGNAL IN UNLICENSED BAND COMMUNICATION SYSTEM, METHOD AND APPARATUS FOR SCHEDULING UPLINK, AND METHOD AND APPARATUS FOR TRANSMITTING INFORMATION ABOUT CHANNEL STATE MEASUREMENT SECTION

CROSS REFERENCE TO RELATED APPLICATION(S)

This application is a U.S. National Stage Application of International Application No. PCT/KR2017/000954, filed on Jan. 26, 2017, which claims the benefit under 35 USC 119(a) and 365(b) of Korean Patent Application No. 10-2016-0011786, filed on Jan. 29, 2016, Korean Patent Application No. 10-2016-0032240, filed on Mar. 17, 2016, Korean Patent Application No. 10-2016-0054577, filed on May 3, 2016, Korean Patent Application No. 10-2016-0103161, filed on Aug. 12, 2016, and Korean Patent Application No. 10-2017-0012229, filed on Jan. 25, 2017, in the Korean Intellectual Property Office.

TECHNICAL FIELD

The present invention relates to a method and apparatus for configuring and transmitting a signal using time division duplex (TDD) in an unlicensed band wireless communication system.

The present invention also relates to a method and an apparatus for scheduling an uplink.

The present invention also relates to a method and apparatus for transmitting information about a channel state measurement section.

BACKGROUND ART

In accordance with the development of an information communication technology, various wireless communication technologies have been developed. The wireless communication technologies may be mainly classified into a wireless communication technology using a licensed band and a wireless communication technology using an unlicensed band (e.g., an industrial scientific medical (ISM) band). Since license of the licensed band is given exclusively to one operator, the wireless communication technology using the licensed band may provide better reliability and communication quality than the wireless communication technology using the unlicensed band.

The representative wireless communication technologies using the licensed band include long term evolution (LTE) defined in the 3rd generation partnership project (3GPP) standard, and the like. A base station (Node B, NB) and a terminal (user equipment, UE) that support the LTE may each transmit and receive the signal through the licensed band.

The representative wireless communication technologies using the unlicensed band include wireless local area network (WLAN) defined in IEEE (institute of electrical and electronics engineers) 802.11 standard, and the like. An access point (AP) and a station that support the WLAN may each transmit and receive the signal through the unlicensed band.

Meanwhile, mobile traffics are recently and explosively increased, and in order to process such mobile traffics through the licensed band, it is required to secure an additional licensed band. However, since the licensed band is finite and may be usually secured through a frequency band auction between the operators, astronomical costs may be incurred to secure the additional licensed band. In order to solve the above-mentioned problem, a method of providing LTE services through the unlicensed band may be considered.

A cell in the unlicensed band has different characteristics from a cell in an existing licensed band. The cell in the unlicensed band opportunistically occupies a channel, and may not continuously occupy the channel over a period of time. Therefore, in order to use an uplink and a downlink of the cell in the unlicensed band in the time division duplex (TDD), it is required to define a channel connection procedure, a frame configuration method, a scheduling method, and a method for transferring response messages of the uplink and the downlink.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method and apparatus for configuring and transmitting a signal through time division duplex (TDD) in an unlicensed band wireless communication system.

Technical Solution

An exemplary embodiment of the present invention provides a method for transmitting an uplink signal in an unlicensed band by a terminal. The method includes receiving first scheduling information that schedules one or more uplink subframes, from a base station in a first downlink subframe; receiving second scheduling information that determines a transmission time point of the uplink signal, from the base station in a second downlink subframe after the first downlink subframe; and transmitting the uplink signal in a first uplink subframe corresponding to the transmission time point among the one or more uplink subframes.

The method may further include invalidating the first scheduling information, when the second scheduling information is not received within a predetermined time from the first downlink subframe.

The predetermined time may be indicated by a timing offset field included in first downlink control information (DCI).

The predetermined time may be included in the first scheduling information or be signaled to the terminal through a radio resource control (RRC) message.

The receiving of the second scheduling information may include receiving the second scheduling information through at least one of physical hybrid automatic repeat request indicator channel (PHICH) and common downlink control information (DCI) of an unlicensed band cell.

The transmitting of the uplink signal may include transmitting the uplink signal in the first uplink subframe, when the terminal belongs to a first terminal group represented by terminal group information included in the second scheduling information.

The transmitting of the uplink signal may include confirming an occupancy state of an unlicensed band channel for a time of 25 μs, before transmitting the uplink signal; and transmitting the uplink signal, when the occupancy state of the unlicensed band channel is a non-occupancy state.

Another embodiment of the present invention provides a method for scheduling an uplink by a base station. The method includes including first information representing a first uplink subframe which is scheduled in first downlink control information (DCI); including second information representing a second uplink subframe which is scheduled in second DCI different from the first DCI; and transmitting the first DCI and the second DCI in a first downlink subframe.

When a value of the first information is X (here, X is a positive integer including 0), an interval between a start of the first downlink subframe and a start of the first uplink subframe may correspond to (4+X) subframes.

The including of the first information in the first DCI may include including third information representing the number of uplink subframes which are continuously scheduled in the first DCI.

When a value of the third information is a first value, a location of the first uplink subframe may be determined based on the first information.

When the value of the third information is different from the first value, the location of the first uplink subframe may be determined regardless of the first information.

When a value of the first information is a first value, the number of uplink subframes which are continuously scheduled may be determined based on the third information.

When the value of the first information is different from the first value, the number of uplink subframes which are continuously scheduled may be determined as 1 regardless of the third information.

The method may further include transmitting information for triggering a sounding reference signal (SRS) transmission within a subframe after a predetermined time from the first downlink subframe, in the first downlink subframe.

The method may further include transmitting information representing whether or not the last time domain symbol of a plurality of time domain symbols included in a subframe after a predetermined time from the first downlink subframe is for a sounding reference signal (SRS) transmission, in the first downlink subframe.

Yet another embodiment of the present invention provides a method for transmitting, by a base station, information related to a first section in which an occupancy state of an unlicensed band channel is measured. The method includes generating first information representing a location of a time domain symbol at which an uplink transmission starts among a plurality of time domain symbols included in a first subframe, in order to inform a terminal whether or not the first section is set in a first time slot included in the first subframe; and generating second information representing a location of a time domain symbol at which an uplink transmission ends among the plurality of time domain symbols, in order to inform the terminal whether or not the first section is set in a second time slot included in the first subframe and present after the first time slot.

When the first section is not set in the first time slot, the first information may represent a first time domain symbol present at the front of the plurality of time domain symbols.

When the first section is set in the first time slot, the first information may represent a time domain symbol different from the first time domain symbol among the plurality of time domain symbols.

When the first section is not set in the second time slot, the second information may represent a first time domain symbol present at the last of the plurality of time domain symbols.

When the first section is set in the second time slot, the second information may represent a time domain symbol different from the first time domain symbol among the plurality of time domain symbols.

The method may further include transmitting the first information and the second information to the terminal through at least one of UE-specific downlink control information (DCI) and common DCI.

The method may further include transmitting a first bit pair representing the first section for the first subframe and a second bit pair representing the first section for a second subframe to the terminal at a first time point.

The first bit pair may include one bit for the first information and one bit for the second information.

The method further include changing a value of the first bit pair when the first section for the first subframe is changed; and transmitting the changed first bit pair and the second bit pair to the terminal at a second time point after the first time point.

Advantageous Effects

According to an embodiment of the present invention, it is possible to configure and transmit the signal through the time division duplex (TDD) in the unlicensed band.

DESCRIPTION OF DRAWINGS

FIG. 1, FIG. 2, FIG. 3, and FIG. 4 are diagrams illustrating exemplary embodiments of a wireless communication network;

FIG. 5 is a diagram illustrating a communication node configuring the wireless communication network;

FIG. 6 is a drawing illustrating an unlicensed band downlink transmission burst according to an exemplary embodiment of the present invention;

FIG. 7A, FIG. 7B, FIG. 7C, and FIG. 7D are diagrams illustrating CCA configurations of an uplink transmission burst;

FIG. 8 is a diagram illustrating a method for signaling CCA symbol configuration information through common DCI according to an exemplary embodiment of the present invention;

FIG. 9 is a diagram illustrating a method for updating CCA symbol configuration information through common DCI according to an exemplary embodiment of the present invention;

FIG. 10A and FIG. 10B are diagrams illustrating SRS configuration locations according to CCA sections, according to an exemplary embodiment of the present invention;

FIG. 11A and FIG. 11B are diagrams illustrating unlicensed band uplink transmission bursts according to an exemplary embodiment of the present invention;

FIG. 12A, FIG. 12B, and FIG. 12C are diagrams illustrating switch subframes included in the unlicensed transmission burst according to an exemplary embodiment of the present invention; and FIG. 13 is a diagram illustrating a method for scheduling multiple uplinks according to an exemplary embodiment of the present invention.

MODE FOR INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, an overlapping description of the same component will be omitted.

In addition, in the present specification, it is to be understood that when any component is referred to as being connected to or coupled to another component, it may be connected directly to or coupled directly to another component or be connected to or coupled to another component with the other component intervening therebetween. On the other hand, in the present specification, it is to be understood that when any component is referred to as being connected directly to or coupled directly to another component, it may be connected to or coupled to another component without the other component intervening therebetween.

In addition, terms used in the present specification are merely used to describe a specific exemplary embodiment and are not intended to limit the present invention.

In addition, in the present specification, singular forms include plural forms unless interpreted otherwise in a context.

In addition, it is to be understood that the term 'comprises' or 'have' used in this specification, specifies the presence of features, numerals, steps, operations, components, parts, or a combination thereof described in the specification, but does not preclude the presence or addition of one or more other features, numerals, steps, operations, components, parts, or a combination thereof.

In addition, in the present specification, a term 'and/or' includes a combination of a plurality of described items or any one of the plurality of described items. In the present specification, term 'A or B' may include 'A', 'B', or 'both A and B'.

In addition, in the present specification, a terminal may refer to a mobile terminal, a station, a mobile station, an advanced mobile station, a high reliability mobile station, a subscriber station, a portable subscriber station, an access terminal, a user equipment (UE), a node, a device, or the like, and may include all or some of the functions of the mobile terminal, the station, the mobile station, the advanced mobile station, the high reliability mobile station, the subscriber station, the portable subscriber station, the access terminal, the user equipment, the node, the device, or the like.

In addition, in the present specification, a base station (BS) may refer to an advanced base station, a high reliability base station, a node B (NB), an evolved node B (eNodeB, eNB), a radio base station, a radio transceiver, an access point, an access node, a radio access station, a base transceiver station, a mobile multi-hop relay (MMR)-BS, a relay station serving as the base station, a high reliability relay station serving as the base station, a repeater, a macro base station, a small base station, or the like, and may include all or some of the functions of the advanced base station, the high reliability base station, the node B, the eNodeB, the radio base station, the radio transceiver, the access point, the access node, the radio access station, the base transceiver station, the MMR-BS, the relay station, the high reliability relay station, the repeater, the macro base station, the small base station, or the like.

Hereinafter, a method for configuring and transmitting a signal in time division duplex (TDD) in an unlicensed band wireless communication system will be described. Specifically, hereinafter, for unlicensed band time division duplex (TDD), a channel connection method, a method for configuring a frame of an unlicensed band cell, a method for transmitting frame configuration information, a scheduling method for allocating resources to a terminal, and a method for transmitting a channel state measurement signal and a response signal will be described.

FIG. 1, FIG. 2, FIG. 3, and FIG. 4 are diagrams illustrating exemplary embodiments of a wireless communication network.

Specifically, FIGS. 1 to 4 illustrate a wireless communication network to which the method and apparatus according to an exemplary embodiment of the present invention are applied. However, this is merely illustrative, and the wireless communication network to which the method and apparatus according to an exemplary embodiment of the present invention are applied is not limited to the wireless communication network described in the present specification. The method and apparatus according to an exemplary embodiment of the present invention may be applied to various wireless communications networks.

FIG. 1 illustrates an exemplary embodiment of the wireless communication network.

In the wireless communication network illustrated in FIG. 1, a first base station 110 may support cellular communications (e.g., LTE, LTE-A (advanced), LTE-U (unlicensed), and the like defined in 3GPP standard). The first base station 110 may support multiple input multiple output (MIMO) (e.g., single user (SU)-MIMO, multi user (MU)-MIMO, massive MIMO, and the like), coordinated multipoint (CoMP), carrier aggregation (CA), and the like. The first base station 110 may be operated in a licensed band F1 and may form a macro cell. The first base station 110 may be connected to other base stations (e.g., a second base station 120, a third base station 130, and the like) through an ideal backhaul or a non-ideal backhaul.

The second base station 120 may be located within a coverage of the first base station 110. The second base station 120 may be operated in an unlicensed band F3 and may form a small cell.

The third base station 130 may be located within the coverage of the first base station 110. The third base station 130 may be operated in the unlicensed band F3 and may form the small cell.

The second base station 120 and the third base station 130 may each support WLAN defined in IEEE 802.11 standard.

The first base station 110 and the terminal (e.g., the UE) connected to the first base station 110 may each transmit and receive signals through carrier aggregation (CA) between the licensed band F1 and the unlicensed band F3.

FIG. 2 illustrates another exemplary embodiment of the wireless communication network.

In the wireless communication network illustrated in FIG. 2, a first base station 210 and a second base station 220 may each support cellular communications (e.g., LTE, LTE-A, LTE-U, and the like defined in 3GPP standard). The first base station 210 and the second base station 220 may each support MIMO (e.g., SU-MIMO, MU-MIMO, macro MIMO, and the like), CoMP, carrier aggregation (CA), and the like. The first base station 210 and the second base station 220 may be each operated in the licensed band F1, and may form the small cell. The first base station 210 and the second base station 220 may be each located within a coverage of a base station forming the macro cell. The first base station 210 may be connected to a third base station 230 through an ideal backhaul or a non-ideal backhaul. The second base station 220 may be connected to a fourth base station 240 through the ideal backhaul or the non-ideal backhaul.

The third base station 230 may be located within the coverage of the first base station 210. The third base station 230 may be operated in the unlicensed band F3 and may form the small cell.

The fourth base station 240 may be located within a coverage of the second base station 220. The fourth base station 240 may be operated in the unlicensed band F3 and may form the small cell.

The third base station 230 and the fourth base station 240 may each support WLAN defined in IEEE 802.11 standard.

The first base station 210, the terminal connected to the first base station 210, the second base station 220, and the terminal connected to the second base station 220 may each transmit and receive signals through carrier aggregation (CA) between the licensed band F1 and the unlicensed band F3.

FIG. 3 illustrates still another exemplary embodiment of the wireless communication network.

In the wireless communication network illustrated in FIG. 3, a first base station 310, a second base station 320, and a third base station 330 may each support cellular communications (e.g., LTE, LTE-A, LTE-U, and the like defined in 3GPP standard). The first base station 310, the second base station 320, and the third base station 330 may each support MIMO (e.g., SU-MIMO, MU-MIMO, macro MIMO, and the like), CoMP, carrier aggregation (CA), and the like.

The first base station 310 may be operated in a licensed band F1 and may form a macro cell. The first base station 310 may be connected to other base stations (e.g., the second base station 320, the third base station 330, and the like) through an ideal backhaul or a non-ideal backhaul.

The second base station 320 may be located within a coverage of the first base station 310. The second base station 320 may be operated in a licensed band F1 and may form a small cell.

The third base station 330 may be located within the coverage of the first base station 310. The third base station 330 may be operated in the licensed band F1 and may form the small cell.

The second base station 320 may be connected to a fourth base station 340 through the ideal backhaul or the non-ideal backhaul. The fourth base station 340 may be located within a coverage of the second base station 320. The fourth base station 340 may be operated in the unlicensed band F3 and may form the small cell.

The third base station 330 may be connected to a fifth base station 350 through the ideal backhaul or the non-ideal backhaul. The fifth base station 350 may be located within a coverage of the third base station 330. The fifth base station 350 may be operated in the unlicensed band F3 and may form the small cell.

The fourth base station 340 and the fifth base station 350 may each support WLAN defined in IEEE 802.11 standard.

The first base station 310, the terminal connected to the first base station 310, the second base station 320, the terminal connected to the second base station 320, the third base station 330, and the terminal connected to the third base station 330 may each transmit and receive signals through carrier aggregation (CA) between the licensed band F1 and the unlicensed band F3.

FIG. 4 illustrates still another exemplary embodiment of the wireless communication network.

In the wireless communication network illustrated in FIG. 4, a first base station 410, a second base station 420, and a third base station 430 may each support cellular communications (e.g., LTE, LTE-A, LTE-U, and the like defined in 3GPP standard). The first base station 410, the second base station 420, and the third base station 430 may each support MIMO (e.g., SU-MIMO, MU-MIMO, macro MIMO, and the like), CoMP, carrier aggregation (CA), and the like.

The first base station 410 may be operated in a licensed band F1 and may form a macro cell. The first base station 410 may be connected to other base stations (e.g., the second base station 420, the third base station 430, and the like) through an ideal backhaul or a non-ideal backhaul.

The second base station 420 may be located within a coverage of the first base station 410. The second base station 420 may be operated in a licensed band F2 and may form a small cell.

The third base station 430 may be located within the coverage of the first base station 410. The third base station 430 may be operated in the licensed band F2 and may form the small cell.

The second base station 420 and the third base station 430 may be each operated in a licensed band F2 different from the licensed band F1 in which the first base station 410 is operated.

The second base station 420 may be connected to a fourth base station 440 through the ideal backhaul or the non-ideal backhaul. The fourth base station 440 may be located within a coverage of the second base station 420. The fourth base station 440 may be operated in the unlicensed band F3 and may form the small cell.

The third base station 430 may be connected to a fifth base station 450 through the ideal backhaul or the non-ideal backhaul. The fifth base station 450 may be located within a coverage of the third base station 430. The fifth base station 450 may be operated in the unlicensed band F3 and may form the small cell.

The fourth base station 440 and the fifth base station 450 may each support WLAN defined in IEEE 802.11 standard.

The first base station 410 and the terminal connected to the first base station 410 may each transmit and receive signals through carrier aggregation (CA) between the licensed band F1 and the unlicensed band F3. The second base station 420, the terminal connected to the second base station 420, the third base station 430, and the terminal connected to the third base station 430 may each transmit and receive signals through carrier aggregation (CA) between the licensed band F2 and the unlicensed band F3.

Meanwhile, communication nodes (e.g., the base stations, the terminals, and the like) configuring the wireless communication network may transmit the signals based on a listen before talk (LBT) procedure in the unlicensed band. That is, the communication nodes may determine an occupancy state of the unlicensed band by performing an energy detection operation. When it is determined that the unlicensed band is in an idle state, the communication nodes may transmit the signals. In this case, the communication nodes may transmit the signals when the unlicensed band is in the idle state during a contention window according to a random backoff operation. On the other hand, when it is determined that the unlicensed band is in a busy state, the communication nodes may not transmit the signals.

Alternatively, the communications nodes may transmit the signals based on a carrier sensing adaptive transmission (CSAT) procedure. That is, the communication nodes may transmit the signals based on a duty cycle which is set (or configured) in advance. When a current duty cycle is a duty cycle allocated for the communication node supporting the cellular communication, the communication nodes may transmit the signals. On the other hand, when the current duty cycle is a duty cycle allocated for the communication node supporting communication (e.g., WLAN, or the like) other than the cellular communication, the communication nodes may not transmit the signals. The duty cycle may be adaptively determined based on the number of the communication nodes that are present in the unlicensed band and support the WLAN, a use state of the unlicensed band, and the like.

The communication nodes may perform discontinuous transmission in the unlicensed band. For example, in the case in which the maximum transmission duration or the maximum channel occupancy time (COT) is set in the unlicensed band, the communication nodes may transmit the signals within the maximum transmission duration. If the communication nodes do not transmit all of the signals within the current maximum transmission duration, the communication nodes may transmit the remaining signals in the next maximum transmission duration. In addition, the communication nodes may select a carrier having a relatively small interference in the unlicensed band, and may be operated in the selected carrier. In addition, in the case in which the communication nodes transmit the signals in the unlicensed band, the communication nodes may adjust transmission power to reduce interference with other communication nodes.

Meanwhile, the communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, a single carrier (SC)-FDMA based communication protocol, an orthogonal frequency division multiplexing (OFDM) based communication protocol, an orthogonal frequency division multiple access (OFDMA) based communication protocol, and the like.

FIG. 5 is a diagram illustrating a communication node (or a computing device) configuring the wireless communication network. The communication node 500 may be the base station or the terminal described in the present specification.

In the exemplary embodiment of FIG. 5, the communication node 500 may include at least one processor 510, a transceiver 520 connected to a network to perform communication, and a memory 530. In addition, the communication node 500 may further include a storage device 540, an input interface device 550, an output interface device 560, and the like. The components included in the communication node 500 may be connected to each other through a bus 570 to perform the communication with each other.

The processor 510 may execute a program command stored in at least one of the memory 530 and the storage device 540. The processor 510 may refer to a central processing unit (CPU), a graphics processing unit (GPU), or a dedicated processor in which the methods according to the exemplary embodiments of the present invention are performed. The processor 510 may be configured to implement procedures, functions, and methods described in relation to the exemplary embodiments of the present invention. The processor 510 may control the respective components of the communication node 500.

Each of the memory 530 and the storage device 540 may store various information related to an operation of the processor 510. Each of the memory 530 and the storage device 540 may include at least one of a volatile storage medium and a non-volatile storage medium. For example, the memory 530 may include at least one of a read only memory (ROM) and a random access memory (RAM).

The transceiver 520 may transmit or receive a wired signal or a wireless signal. In addition, the communication node 500 may have a single antenna or multiple antennas.

Meanwhile, the communication node may be operated as follows in the wireless communication network. Even in a case in which a method (e.g., transmission or reception of the signal) performed by a first communication node of the communication nodes is described, a second communication node corresponding to the first communication node may perform a method (e.g., transmission or reception of the signal) corresponding to the method performed by the first communication node. That is, in a case in which an operation of the terminal is described, the base station corresponding to the terminal may perform an operation corresponding to the operation of the terminal. On the contrary, in a case in which an operation of the base station is described, the terminal corresponding to the base station may perform an operation corresponding to the operation of the base station.

In a long term evolution (LTE) downlink (DL), one subframe includes two time slots (a first time slot and a second time slot). Each of the time slots includes seven or six time domain symbols (e.g., OFDM symbols). That is, one subframe may include fourteen time domain symbols (e.g., time domain symbols 0 to 13) or twelve time domain symbols (e.g., time domain symbols 0 to 11). In the present specification, the time domain symbol may be an OFDM symbol, an OFDMA symbol, or an SC-FDMA symbol, depending on a multiple access system. For example, in a case in which the OFDM symbol is used in the present specification, the OFDM symbol may be replaced with the SC-FDMA symbol, and vice versa.

The maximum three or four OFDM symbols included in a front portion of the subframe include control channels. A downlink control channel in the licensed band may include, for example, a physical control format indicator channel (PCFICH), a physical downlink control channel (PDCCH), a physical hybrid automatic repeat request indicator channel (PHICH), and the like. The remain portions of the subframe may be basically allocated with a physical downlink shared channel (PDSCH), which is a data channel for data transmission, and some resource blocks (RBs) may be allocated with an enhanced physical downlink control channel (EPDCCH).

A first OFDM symbol within the subframe includes PCFICH that transmits information about the number of OFDM symbols used to transmit the control channel. 또한 control channel 영역에는 uplink (UL: In addition, the control channel region includes PHICH that transmits a hybrid automatic repeat request (HARQ) acknowledgment/negative-acknowledgment (ACK/NACK) signal, which is response information on the uplink (UL) transmission. Downlink control information (DCI), which is control information, is transmitted through PDCCH and ePDCCH. The DCI may include resource allocation information or resource control information for the terminal and a group of a plurality of terminals. For example, the DCI may include uplink scheduling information, downlink scheduling information, uplink transmit power control command, and the like.

The DCI, which is the control information transmitted through the PDCCH or the ePDCCH, has different formats depending on kinds and the number of information fields, the number of bits of each information field, and the like.

DCI formats 0, 3, 3A, 4, and 4A are defined for an uplink. DCI formats 1, 1A, 1 B, 1C, 1 D, 2, 2A, 2B, 2C, and 2D may be defined for a downlink. Each of the DCI formats selectively includes information such as carrier indicator field (CIF), assignment (RB), modulation coding scheme (MCS), redundancy version (RV), new data indicator (NDI), transmit power control (TPC), HARQ process number, precoding matrix indicator (PMI) confirmation, hopping flag, flag field, and the like, depending on the formats. Therefore, a size of the control information that conforms to the DCI format may vary. In addition, the same DCI format may be used to transmit two or more types of control information. In this case, the control information is classified by the flag field of the DCI format. The following Table 1 summarizes information included in the respective DCI formats.

TABLE 1

| DCI Format | information |
| --- | --- |
| Format 0 | Resource grants for PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustments |

The PDCCH (or ePDCCH) is transmitted through aggregation of one or a plurality of consecutive control channel elements (CCEs) (or enhanced CCEs (eCCEs)). In the present specification, the PDCCH or the ePDCCH is referred to as (e)PDCCH, and the CCE or the eCCE is referred to as (e)CCE.

The (e)CCE is a logical allocation unit, and includes a plurality of resource element groups (REGs). The number of bits transmitted through the (e)PDCCH is determined according to a relationship between the number of the (e)CCEs and code rates provided by the (e)CCEs.

Cyclic redundancy check (CRC) for an error detection is attached to the control information transmitted through the (e)PDCCH according to the DCI format. The CRC is masked with identifier radio network temporary identifier (RNTI), depending on a (e)PDCCH reception target (e.g., the terminal, or the like) or a (e)PDCCH reception purpose. Specifically, the CRC scrambled based on the RNTI is attached to the control information transmitted through the (e)PDCCH.

The types and values of RNTI may be summarized as illustrated in Table 2 below.

TABLE 2

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, eIMTA-RNTI, TPC-PUCCH-RNTI, TPC-PUSCH-RNTI and SL-RNTI |

TABLE 2-continued

| Value (hexa-decimal) | RNTI |
| --- | --- |
| 003D-FFF3 | C-RNTI, Semi-Persistent Scheduling C-RNTI, eIMTA-RNTI, Temporary C-RNTI, TPC-PUCCH-RNTI, TPC-PUSCH-RNTI and SL-RNTI |
| FFF4-FFFC | Reserved for future use |
| FFFD | M-RNTI |
| FFFE | P-RNTI |
| FFFF | SI-RNTI |

Purposes of the respective RNTIs are illustrated in Table 3 below.

TABLE 3

| RNTI | Purpose |
| --- | --- |
| P-RNTI | Paging and System Information change notification |
| SI-RNTI | Broadcast of System Information |
| M-RNTI | MCCH Information Change notification |
| RA-RNTI | Random Access Response |
| eIMTA-RNTI | eIMTA TDD UL/DL Configuration Notification |
| Temporary C-RNTI | Contention Resolution (when no valid C-RNTI is available) |
| Temporary C-RNTI | Msg3 transmission |
| C-RNTI | Dynamically scheduled unicast transmission (uplink or downlink) |
| C-RNTI | Triggering of PDCCH ordered random access |
| Semi-Persistent Scheduling C-RNTI | Semi-Persistently scheduled unicast transmission (activation, reactivation and retransmission) |
| Semi-Persistent Scheduling C-RNTI | Semi-Persistently scheduled unicast transmission (deactivation) |
| TPC-PUCCH-RNTI | Physical layer uplink power control |
| TPC-PUSCH-RNTI | Physical layer uplink power control |
| SL-RNTI | Dynamically scheduled sidelink transmission |

An identifier associated with the unlicensed band cell may be defined as follows.

In the present specification for convenience, the identifier associated with the unlicensed band cell is referred to as an unlicensed cell-RNTI (U-RNTI) or CC-RNTI (e.g., a designated identifier of common information for the unlicensed band). The U-RNTI or the CC-RNTI defined in the present specification may be referred differently depending on information of the unlicensed band cell. A value of the U-RNTI or the CC-RNTI may be transmitted to the terminal by a higher layer message or a radio resource control (RRC) message. The value of the U-RNTI or the CC-RNTI defined in the present specification may be informed through an RRC signaling. The DCI including the CRC masked through the U-RNTI or the CC-RNTI may be transmitted through an unlicensed band PDCCH common search space. The DCI including the CRC masked through the U-RNTI or the CC-RNTI may include common control information of the unlicensed band cell. For example, the DCI may include information on a partial subframe (e.g., a length smaller than 1 ms transmission time section (TTI)) of the downlink transmission burst. Alternatively, the DCI may include common control information of the uplink of the unlicensed band. For example, the DCI may include a counter value of the random backoff for a channel connection of the uplink transmission burst. As another example, the number of the scheduled consecutive uplink subframes may be designated by the DCI.

1. Structure of Unlicensed Band LTE Frame

A frame structure type 3 (FST-3) of an LTE system is applied to a licensed-assisted-access (LAA) secondary cell (SCell) having a normal cyclic prefix (CP).

The FST-3 may include a consecutive set (hereinafter, referred to as 'downlink transmission burst') of downlink subframes (length of 1 ms). Here, a starting downlink partial subframe including the second time slot or an ending downlink partial subframe including a time domain symbol having a downlink pilot time slot (DwPTS) length may be each included in a start and an end of the downlink transmission burst. A channel occupancy signal may be included before the start or at the end of the transmission of the downlink transmission burst, for purpose of channel occupancy.

FIG. 6 is a drawing illustrating an unlicensed band downlink transmission burst according to an exemplary embodiment of the present invention.

Specifically, FIG. 6 illustrates a case in which the downlink transmission burst includes two kinds of downlink partial subframes (e.g., the starting downlink partial subframe including the second time slot, the ending downlink partial subframe having a length of DwPTS), M (e.g., four) downlink subframes (e.g., 1 ms TTI subframes), and channel occupancy signals located before and after the downlink transmission burst. Depending on a transmission time point environment, the partial subframe or the channel occupancy signal may not be included in the downlink transmission burst.

Meanwhile, the FST-3 may include a consecutive set (hereinafter, referred to as 'uplink transmission burst') of uplink subframes. The uplink transmission burst may also be defined as a consecutive uplink set in perspective of transmission of each terminal, and may also be defined as a consecutive uplink set in perspective of reception of the base station.

Each subframe of the uplink transmission burst may include a channel state measurement (e.g., clear channel assessment (CCA)) section for confirming whether the channel is occupied or emptied. The CCA section (e.g., a section in which an occupancy state of the unlicensed band channel is measured) may be included before the subframe, and may include at least one SC-FDMA symbol. Alternatively, the CCA section may be included after the subframe, and may include at least one SC-FDMA symbol.

The CCA section included before or after the subframe may be included in all uplink subframes or may also be included only in a specific uplink subframe.

In the case in which the CCA section is included only in the specific uplink subframe, the terminal may receive related information included in the DCI of the downlink that grants the specific uplink subframe including the CCA section and assess the specific uplink subframe including the CCA section. Alternatively, in the case in which the CCA section is included only in the specific uplink subframe, the terminal may receive related information included in the common DCI (the CRC is masked through CC-RNTI), in the downlink including the DCI that grants the specific uplink subframe including the CCA section, and assess the specific uplink subframe including the CCA section. Here, the related information may include at least one of whether or not the CCA is configured, a CCA method (e.g., a random backoff or a single CCA slot), a CCA configuration symbol length, a random backoff value, and a contention window size.

In the case in which the CCA section is configured, the terminal does not configure a physical uplink shared channel (PUSCH) or a physical uplink control channel (PUCCH) in resource elements of a time domain symbol(s) belonging to the CCA section.

The method for confirming the CCA configuration length by the terminal is as follows. For example, the terminal may immediately confirm the CCA configuration length through the number of CCA configuration symbols (e.g., the number of the time domain symbols configuring the CCA section) included in the DCI. In the present specification, the CCA symbol refers to time domain symbol which may be used for CCA. As another example, the terminal may confirm the required number of CCA configuration symbols according to the random backoff value included in the DCI. As still another example, the terminal may confirm the required number of CCA configuration symbols according to the contention window size value included in the DCI. As still another example, all terminals may previously know that the CCA section is at least one time domain symbol of the first (or last) of the time domain symbols of the subframe. As still another example, the number of CCA configuration symbols or the location of the CCA configuration symbol (e.g., the start of the subframe or the end of the subframe) may be transmitted to the terminal by the RRC message of the higher layer. As still another example, in the case in which two or more uplink subframes are consecutively granted in one downlink subframe, the terminal may also expect that the CCA section is not configured in the uplink subframe after a first uplink subframe among the granted uplink subframes.

The terminal may perform a rate matching for information to be transmitted to the remaining REs other than the REs corresponding to the time domain symbols configured for CCA, and may transmit the rate matched information.

FIG. 7A, FIG. 7B, FIG. 7C, and FIG. 7D are diagrams illustrating CCA configurations of an uplink transmission burst.

FIGS. 7A and 7B illustrate a case in which the CCA section is included after the subframe. For example, FIG. 7A illustrates a case in which the CCA section is included in all of M (e.g., four) uplink subframes included in the uplink transmission burst, and FIG. 7B illustrates a case in which the CCA section is included only in a second subframe and a fourth subframe among the M (e.g., four) uplink subframes included in the uplink transmission burst.

FIGS. 7C and 7D illustrate a case in which the CCA section is included before the subframe. For example, FIG. 7C illustrates a case in which the CCA section is included in all of M (e.g., four) uplink subframes included in the uplink transmission burst, and FIG. 7D illustrates a case in which the CCA section is included only in a first subframe and a third subframe among the M (e.g., four) uplink subframes included in the uplink transmission burst.

Meanwhile, information about the CCA symbol configuration described above may be dynamically informed to the terminal. The base station transmits information (hereinafter, referred to as 1 first location information) indicating a location of the time domain symbol at which the uplink transmission starts among a plurality of time domain symbols included in the subframe to the terminal, thereby making it possible to inform the terminal whether or not the time domain symbol (or the CCA section) in which CCA may be performed may be included (or set) before (e.g., a first time slot of the subframe) the subframe. For example, the base station may instruct the terminal to start the uplink transmission from the first time domain symbol (e.g., a time domain symbol 0), or to start the uplink transmission from the second time domain symbol (e.g., a time domain symbol 1) (in this case, the time domain symbol 0 is used for CCA). That is, in a case in which the CCA section is not set before (e.g., in the first time slot of) the subframe, first location information generated by the base station may indicate a time domain symbol (e.g., the time domain symbol 0) that is present at the front among the plurality of time domain symbols included in the subframe. In the case in which the CCA section is set before (e.g., in the first time slot of) the subframe, the first location information may indicate the time domain symbol (e.g., the time domain symbol 0) that is present at the front and another time domain symbol (e.g., the time domain symbol 1) among the plurality of time domain symbols included in the subframe.

The base station transmits information indicating a location of the time domain symbol at which the uplink transmission ends among the plurality of time domain symbols included in the subframe to the terminal, thereby making it possible to inform the terminal whether or not the time domain symbol (or the CCA section) in which CCA may be performed may be included (or set) after (e.g., the second time slot of the subframe) the subframe. For example, the base station may instruct the terminal to perform the uplink transmission up to the last time domain symbol (e.g., a time domain symbol 13), or to perform the uplink transmission only up to the next to last time domain symbol (e.g., a time domain symbol 12) (in this case, the time domain symbol 13 is used for CCA). That is, in a case in which the CCA section is not set after (e.g., in the second time slot of) the subframe, second location information generated by the base station may indicate a time domain symbol (e.g., the time domain symbol 13) that is present at the last among the plurality of time domain symbols included in the subframe. In the case in which the CCA section is set after (e.g., in the second time slot of) the subframe, the second location information may indicate the last time domain symbol (e.g., the time domain symbol 13) and another time domain symbol (e.g., the time domain symbol 12) among the plurality of time domain symbols included in the subframe.

Alternatively, the base station may signal the number of time domain symbols for the uplink transmission to the terminal to inform the terminal whether or not the time domain symbol (or the CCA section) in which the CCA may be performed is located after the subframe. For example, the base station may signal that the number of time domain symbols that the terminal may use for the uplink transmission is 13 or 12 to the terminal to inform the terminal of the CCA symbol configuration information after the subframe.

The terminal may determine the CCA symbol configuration information of the corresponding subframe by confirming the CCA symbol configuration information after the subframe (e.g., information on the time domain symbol that is located after the subframe and may be used for the CCA) together with the CCA symbol configuration information before the subframe (e.g., information on the time domain symbol which is located before the subframe and may be used for the CCA).

The above-mentioned CCA symbol configuration information (or the information on the time domain symbol configuring the CCA section) (e.g., the number or the location of the CCA symbols, etc.) may be included in a UE-specific DCI. Alternatively, the base station may inform the terminal of the CCA symbol configuration information for the plurality of uplink subframes through the unlicensed band common DCI. For example, the base station may transmit the first location information and the second location information to the terminal through the UE-specific DCI or the common DCI.

Since the terminal demodulates the common DCI of the unlicensed band cell, the terminal may confirm the CCA symbol configuration information, regardless of whether the uplink grant is cross carrier scheduled in the licensed band or the uplink grant is self-scheduled in the unlicensed band. For example, the base station may signal the CCA configuration information on M subframes of the unlicensed band cell to the terminal.

The common DCI information may not be transmitted in all downlink subframes. In this case, the terminal may expect that previous DCI information is valid.

The CCA symbol configuration information may be updated to information included in newly received common DCI. For example, in the case in which the CCA symbol configuration information included in the common DCI of an n-th downlink subframe (e.g., the CCA symbol configuration information on a (n+6)-th subframe) and the CCA symbol configuration information included in the common DCI of a (n+1)-th downlink subframe (e.g., the CCA symbol configuration information on a (n+6)-th subframe) are different from each other, the terminal may conform the common DCI information of the (n+1)-th subframe.

FIG. 8 is a diagram illustrating a method for signaling CCA symbol configuration information through common DCI according to an exemplary embodiment of the present invention.

Specifically, FIG. 8 illustrates a case in which the base station informs the terminal of the CCA symbol configuration information on M (e.g., six) uplink subframes through the common DCI.

Among two tuple bits, one bit may represent the CCA symbol configuration information before the subframe (e.g., 0: start transmission at the time domain symbol 0, 1: start transmission at the time domain symbol 1), and the other bit may represent the CCA symbol configuration information after the subframe (e.g., 0: perform transmission up to the time domain symbol 13, 1: perform transmission up to the time domain symbol 12). That is, a pair of bits representing the CCA section for one subframe may include one bit for the first location information and one bit for the second location information.

For example, the base station may inform the terminal of the CCA symbol configuration information on six uplink subframes (e.g., (n+4) to (n+9)-th subframes) after a predetermined time from the n-th subframe, through the common DCI of the n-th subframe (the downlink subframe). FIG. 8 illustrates a case in which the predetermined time corresponds to four subframes (e.g., 4 ms). The CCA symbol configuration information transmitted to the terminal may include a pair of bits (or tuple bits) representing the CCA section for the respective uplink subframes (e.g., the (n+4) to (n+9)-th subframes). As illustrated in FIG. 8, in the case in which the CCA symbol configuration information included in the common DCI is [10 00 11 01 10 10], the time domain symbol 0 of the (n+4)-th subframe may be used for the CCA (the tuple bits=10), the (n+5)-th subframe does not include the CCA symbol (the tuple bits=00), the time domain symbols 0 and 13 of the (n+6)-th subframe may be used for the CCA (the tuple bits=11), the time domain symbol 13 of the (n+7)-th subframe may be used for the CCA (the tuple bits=01), the time domain symbol 0 of the (n+8)-th subframe may be used for the CCA (the tuple bits=10), and the time domain symbol 0 of the (n+9)-th subframe may be used for the CCA (the tuple bits=10).

FIG. 9 is a diagram illustrating a method for updating CCA symbol configuration information through common DCI according to an exemplary embodiment of the present invention.

Specifically, FIG. 9 illustrates a case in which the CCA configuration of the (n+7)-th subframe is changed, as the CCA symbol configuration information included in the common DCI of the n-th downlink subframe (e.g., a first time point) and the common DCI of the (n+1)-th downlink subframe (e.g., a second time point after the first time point) is changed.

For example, the base station may inform the terminal of the CCA symbol configuration information on six uplink subframes (e.g., (n+4) to (n+9)-th subframes) after a predetermined time from the n-th downlink subframe, through the common DCI of the n-th downlink subframe. FIG. 9 illustrates a case in which the predetermined time corresponds to four subframes (e.g., 4 ms). In the case in which the CCA symbol configuration information included in the common DCI of the n-th downlink subframe is [10 10 01 01 11 10], the time domain symbol 0 of the (n+4)-th subframe may be used for the CCA (the tuple bits=10), the time domain symbol 0 of the (n+5)-th subframe may be used for the CCA (the tuple bits=10), the time domain symbol 13 of the (n+6)-th subframe may be used for the CCA (the tuple bits=01), the time domain symbol 13 of the (n+7)-th subframe may be used for the CCA (the tuple bits=01), the time domain symbols 0 and 13 of the (n+8)-th subframe may be used for the CCA (the tuple bits=11), and the time domain symbol 0 of the (n+9)-th subframe may be used for the CCA (the tuple bits=10).

In this situation, in the case in which the CCA symbol configuration information included in the common DCI of the (n+1)-th downlink subframe is [10 01 11 11 10 01], the CCA symbol configuration information on M (e.g., six) uplink subframes (e.g., (n+5) to (n+10)-th subframes) may be updated. That is, the time domain symbol 0 of the (n+5)-th subframe may be used for the CCA (the tuple bits=10), the time domain symbol 13 of the (n+6)-th subframe may be used for the CCA (the tuple bits=01), the time domain symbols 0 and 13 of the (n+7)-th subframe may be used for the CCA (the tuple bits=11), the time domain symbols 0 and 13 of the (n+8)-th subframe may be used for the CCA (the tuple bits=11), the time domain symbol 0 of the (n+9)-th subframe may be used for the CCA (the tuple bits=10), and the time domain symbol 13 of the (n+10)-th subframe may be used for the CCA (the tuple bits=01). For example, in the case in which the CCA section for the (n+7)-th subframe is changed, the base station may change a value of a pair of bits (or tuple bits) representing the CCA section of the (n+7)-th subframe, and may transmit the CCA symbol configuration information (e.g., [10 01 11 11 10 01]) including the changed pair of bits to the terminal in the (n+1)-th downlink subframe.

Meanwhile, in the case in which the CCA symbol is included before the subframe and the signal transmission starts from the second time domain symbol (e.g., the time domain symbol 1) of the subframe, the terminal may transmit the signal at any sample location within a section of the first time domain symbol (e.g., the time domain symbol 0) according to an LBT result. In this case, the signal transmitted in the section of the first time domain symbol (e.g., the time domain symbol 0) may be any signal for a channel occupancy, and the terminal may transmit any signal for the channel occupancy by puncturing an original first time domain symbol (e.g., the time domain symbol 0).

The last time domain symbol (e.g., SC-FDMA symbol) of the LTE uplink subframe may include a sounding reference signal (SRS). In the case in which the CCA section (or the CCA symbol) of the unlicensed band uplink is included, for example, the SRS may be included immediately after the first CCA section, or may be included immediately before the last CCA section. The case in which the SRS is included in the exemplary embodiments of FIGS. 7A and 7C described above will be described in detail with reference to FIGS. 10A and 10B.

FIG. 10A and FIG. 10B are diagrams illustrating SRS configuration locations according to CCA sections, according to an exemplary embodiment of the present invention.

Specifically, FIG. 10A illustrates a case in which the CCA section is included in all of M (e.g., four) uplink subframes (the CCA section is included after the subframe) included in the uplink transmission burst and the SRS is included before the CCA section.

FIG. 10B illustrates a case in which the CCA section is included in all of M (e.g., four) uplink subframes (the CCA section is included before the subframe) included in the uplink transmission burst and the SRS is included after the CCA section.

Meanwhile, in the unlicensed uplink transmission burst, an existing SRS transmission location may also be configured as a section for a channel state assessment (CCA). In the case in which the SRS (or SRS section) is configured as the CCA section, the PUCCH of the subframe including the corresponding CCA section may be transmitted as a Shortened PUCCH structure, and the SRS is not transmitted in the corresponding CCA section. Here, the Shortened PUCCH refers to PUCCH having a length shorter than an existing PUCCH. The corresponding CCA section may be used for purpose of CCA of the terminal allocated to the next uplink subframe. One or more subframes including the CCA section may be included in the uplink transmission burst.

Alternatively, the transmission of CCA and SRS may be performed during the section of the last time domain symbol (e.g., SC-FDMA symbol) within the subframe. The SRS in this case has a length shorter than an existing SRS, and is hereinafter referred to as 'Shortened SRS'. The Shortened SRS may be an SRS consisting of two or more RE intervals, rather than an SRS consisting of two RE intervals. For example, in the case in which the SRS consists of four RE intervals, a repetition pattern appears during the time domain symbol (e.g., SC-FDMA symbol) in the time domain (or a time region), and the Shortened SRS may transmit only one, two, or three repetition patterns of four repetition patterns. In addition, the remaining section (e.g., the remaining repetition pattern) may be used for the CCA. One or more subframes including the CCA section and the Shortened SRS may be included in the uplink transmission burst.

Meanwhile, an SRS symbol set consisting of one or more time domain symbols (e.g., SC-FDMA symbols) may be included in the uplink transmission burst. That is, the SRS symbol set includes at least one time domain symbol for the SRS transmission.

The SRS symbol set may be included (located) before the uplink subframe set such as an uplink pilot time slot (UpPTS) of a frame structure type 2 (FST-2). Alternatively, the SRS symbol set includes a plurality of time domain symbols (SC-FDMA symbols) (starts from a start time point of the subframe), and may be included in the last uplink subframe set. Alternatively, the SRS symbol set may be included (located) in the second time slot of the subframe.

Meanwhile, a physical random access channel (PRACH) may also be included before the uplink transmission burst. The PRACH may be configured independently from the SRS, and may be configured simultaneously with the SRS by multiplexing a frequency domain resource (or a frequency region resource). In addition, the channel occupancy signal may be included before the uplink transmission burst. The unlicensed band uplink transmission burst will be described with reference to FIGS. 11A and 11B.

FIG. 11A and FIG. 11B are drawings illustrating unlicensed band uplink transmission bursts according to an exemplary embodiment of the present invention.

Specifically, FIG. 11A illustrates a case in which the SRS symbol sets are included before and after the uplink transmission burst. The SRS symbol set included before the uplink transmission burst may include L time domain symbols (e.g., SC-FDMA symbols) among the time domain symbols of the n-th subframe. The SRS symbol set included after the uplink transmission burst may have the same length as the second time slot of the subframe. For example, PUSCH may be included in the first time slot of the (n+5)-th subframe, and the SRS symbol set may be included in the second time slot thereof. The uplink transmission burst illustrated in FIG. 11A includes M (e.g., four) uplink subframes (e.g., (n+1) to (n+4)-th subframes), and at least one (e.g., the (n+2)-th subframe) of the M uplink subframes may include the CCA section instead of the SRS section.

Specifically, L time domain symbols (e.g., SC-FDMA symbols) in which the PRACH and the SRS are multiplexed may be configured (included) before the uplink transmission burst illustrated in FIG. 11B. That is, the multiplexed PRACH and SRS may be configured (included) in the L time domain symbols among the time domain symbols of the n-th subframe. The SRS symbol set included after the uplink transmission burst illustrated in FIG. 11B may include N time domain symbols (e.g., SC-FDMA symbols) among the time domain symbols of the (n+5)-th subframe. The uplink transmission burst illustrated in FIG. 11B includes M (e.g., four) uplink subframes (e.g., (n+1) to (n+4)-th subframes), and at least one (e.g., the (n+2)-th subframe) of the M uplink subframes may include the CCA section and the Shortened SRS section instead of the SRS section.

Meanwhile, in the FST-3, the downlink transmission burst and the uplink transmission burst described above may be continuously transmitted. Hereinafter, the downlink transmission burst and the uplink transmission burst which are continuously transmitted are referred to as 'unlicensed transmission bursts'.

A section (hereinafter, referred to as 'non-transmission section (No_Tx)') in which there is no signal transmission during a predetermined interval may be included between the downlink transmission burst and the uplink transmission burst in the unlicensed transmission burst.

In the case in which the last subframe and the next subframe included in the downlink transmission burst are consecutively configured in the uplink, hereinafter, the last downlink subframe included in the downlink transmission burst is referred to as 'a switch subframe'.

In the non-transmission section (No_Tx), the CCA may be performed by the terminal according to a defined channel access procedure. The switch subframe will be described with reference to FIGS. 12A to 12C.

FIG. 12A, FIG. 12B, and FIG. 12C are diagrams illustrating switch subframes included in the unlicensed transmission burst according to an exemplary embodiment of the present invention.

Specifically, FIGS. 12A to 12C illustrate sets of signals included in the downlink transmission burst and the uplink transmission burst which are previously defined.

The switch subframe may be configured by different sets of the signals which may be included in the downlink transmission burst and the uplink transmission burst.

For example, as illustrated in FIG. 12A, the switch subframe may include a downlink partial subframe having a length of DwPTS, a channel occupancy signal, a non-transmission section (No_Tx), and an SRS symbol set. Here, the SRS symbol set may include N time domain symbols among the time domain symbols of the switch subframe.

As another example, as illustrated in FIG. 12B, the switch subframe may include a downlink partial subframe having a length of DwPTS, a non-transmission section (No_Tx), and a PRACH symbol set. Here, the PRACH symbol set may include at least one time domain symbol for the PRACH transmission.

As still another example, as illustrated in FIG. 12C, the switch subframe may include a downlink partial subframe having a length of DwPTS, a channel occupancy signal, and a non-transmission section (No_Tx).

2. Channel Access Procedure

In the unlicensed band, it is required to first confirm the channel state according to the channel access procedure, before the communication node transmits the burst.

2.1. Downlink Channel Access Procedure

A downlink channel access procedure may include a channel access procedure for the downlink transmission burst. For the channel access procedure for the downlink transmission burst, different parameter values are defined depending on the classification of the traffic to be transmitted by the communication node. Table 4 below illustrates channel access priority classes according to four classes (Voice, Video, best effort (BE), background (BK)) of the traffic to be transmitted by the communication node. The smaller the value of the channel access priority class is, the higher the priority is. According to the value of the channel access priority class, a contention window size (CWS) and a maximum occupancy time (Max. COT) are defined differently from each other.

In Table 4, a channel access method (category 4) for wireless LAN and LAA performs the transmission when a randomly selected count value among the CWSs becomes 0, after waiting for a predetermined time from a moment at which the signal occupying the channel disappears. Here, the predetermined time may include a fixed time of 16 µs, and $K_{slot}$ slots (one slot has a length of 9 µs).

TABLE 4

| Channel Access Priority Class | $K_{slot}$ | CWS for $N_{slot}$ | Max. COT |
|---|---|---|---|
| 1 (Voice) | 1 | {3, 7} | 2 ms |
| 2 (Video) | 1 | {7, 15} | 3 ms |
| 3 (BE) | 3 | {15, 31, 63} | 10 ms or 8 ms |
| 4 (BK) | 7 | {15, 31, 63, 127, 255, 511, 1023} | 10 ms or 8 ms |

Meanwhile, two methods for CCA are present. A first CCA method is to perform the CCA by the fixed length (e.g., 16 µs) and the number of $K_{slot}$ CCA slots for a predetermined time T. A second CCA method is to perform the CCA for a time including the number of randomly selected CCA slots among positive integer that is smaller than the contention window size ($N_{slot}$) and is greater than 0.

According to an access procedure class (or channel access priority class), a transmission opportunity (TxOP) in which the communication node may consecutively use the channel is defined.

In the case in which the uplink transmission burst is also included in the TxOP according to the channel access procedure for the downlink transmission burst, the channel access procedure of the downlink transmission burst may be performed with a parameter (e.g., $K_{slot}=7$, $N_{slot}=\{15, 31, 63, 127, 255, 511, 1023\}$, Max. COT=10 ms or 8 ms) of the lowest priority.

In order for the communication node to transmit the downlink subframe including the DCI for allocation of the uplink subframe, the channel access procedure parameter (e.g., $K_{slot}=7$, $N_{slot}=\{15, 31, 63, 127, 255, 511, 1023\}$, Max. COT=10 ms or 8 ms) of the lowest priority may be used.

2.2. Uplink Channel Access Procedure

For the uplink transmission burst, three channel access procedures may be defined.

In a first UL method, the communication node transmits the subframe including uplink signals (or channels) at a scheduled time point, without confirming a channel occupancy state.

In a second UL method, the communication node confirms the channel occupancy state during the fixed length and transmits the subframe including the uplink signals (or channels) when the channel is not occupied.

In a third UL method, the communication node confirms the channel occupancy state during the randomly selected CCA slot length and transmits the subframe including the uplink signals (or channels) when the channel is not occupied.

The first UL method may be used for the following transmission.

For example, in the TxOP including the parameter for the lowest priority of the downlink channel access priority class, the transmission of the uplink transmission burst transmitted after the non-transmission section (No_Tx) of a predetermined length after the downlink transmission burst may be performed at a scheduled time point without confirming the channel state.

As another example, a maximum time in which the consecutive transmission is possible within one TxOP is defined, and the transmission of the uplink transmission burst transmitted after the non-transmission section (No_Tx) of a predetermined length after the maximum consecutive transmission time may be performed at a scheduled time point without confirming the channel state.

As still another example, the transmission of the uplink subframes transmitted after a first subframe of the uplink transmission burst during one TxOP section may be performed at a scheduled time point without confirming the channel state. Here, the first subframe may be an uplink subframe including the PUSCH, or a subframe including a PRACH symbol set or an SRS symbol set having a length of 1 ms or less. The first subframe may be transmitted by the terminal after the channel occupancy state is confirmed immediately before the transmission, according to a transmission condition. The terminal which is scheduled (or allocated) for a subframe after the first subframe may not be scheduled for the first subframe. The communication node does not confirm the channel occupancy state immediately before transmitting the subframes after the first subframe, but the non-transmission section (No_Tx) having a predetermined length may be configured. That is, the first subframe among the uplink burst scheduled to a plurality of terminals by the base station may not be scheduled to a specific terminal. For the terminals that the first subframe (the confirmation of the channel access state is performed) is not included in the scheduled subframe, the base station may configure the non-transmission section (No_Tx) having a predetermined length between the subframes. For example, the length of the non-transmission section (No_Tx) may be 9 μs, 16 μs, 25 μs, 34 μs, or hundreds μs. The terminal may confirm through the DCI message within the (e)PDCCH scheduling the corresponding subframe that the scheduled subframe is not the first subframe of the uplink transmission burst. For example, the first subframe and a subframe after the first subframe may be separated by 1 bit.

As another example, the terminal that has confirmed the channel occupancy state at least once during one TxOP section may perform the uplink transmission or the SRS transmission of discontinuously scheduled subframe, without confirming the channel occupancy state immediately before the transmission thereof. In this case, the last predetermined section within a previous subframe of the subframe scheduled to the terminal may be configured as the non-transmission section (No_Tx) for the terminal that is initially scheduled for the TxOP. However, the terminal may not need to additionally confirm the channel occupancy state.

As another still example, it is possible for the communication node (e.g., the terminal) to transmit the SRS which is consecutively transmitted after transmitting the first SRS in the SRS symbol set, without confirming the channel occupancy state. In this case, the communication node (e.g., the terminal) may confirm the channel occupancy state immediately before transmitting the first SRS. In addition, even in the case in which the terminal that does not perform the transmission of the first SRS transmits the SRS after the first SRS, it is possible for the terminal to perform the SRS transmission without confirming the channel occupancy state.

As still another example, the transmission of the uplink that does not include the PUSCH and includes only the SRS symbol set may be performed at the scheduled time point without the confirming the channel state. In this case, the communication node (e.g., the terminal) may perform the transmission of the uplink that includes only the SRS symbol set without confirming the channel occupancy state after the non-transmission section (No_Tx) of a predetermined length after the downlink transmission burst ends. Here, the length of the non-transmission section (No_Tx) may be 9 μs, 16 μs, 25 μs, 34 μs, or hundreds μs.

As still another example, the transmission of the uplink subframe that does not include the PUSCH and includes only the PUCCH may be performed at the scheduled time point without the confirming the channel state. In this case, the communication node (e.g., the terminal) may transmit the uplink subframe that includes only the PUCCH without confirming the channel occupancy state after the non-transmission section (No_Tx) of a predetermined length after the downlink transmission burst ends. Here, the length of the non-transmission section (No_Tx) may be 9 μs, 16 μs, 25 μs, 34 μs, or hundreds μs.

As still another example, the transmission of the uplink that does not include the PUSCH and includes only the PRACH may be performed at the scheduled time point without the confirming the channel state. In this case, the communication node (e.g., the terminal) may perform the transmission of the uplink that includes only the PRACH without confirming the channel occupancy state after the non-transmission section (No_Tx) of a predetermined length after the downlink transmission burst ends. Here, the length of the non-transmission section (No_Tx) may be 9 μs, 16 μs, 25 μs, 34 μs, or hundreds μs.

The second UL method may be used for the following transmission.

For example, the communication node (e.g., the terminal) may confirm the channel state during a predetermined time, before transmitting the first SRS or the PRACH within the switch subframe after the downlink transmission burst during one TxOP section. Alternatively, the communication node (e.g., the terminal) may confirm the channel state during a predetermined time, before transmitting a first uplink subframe (including the PUSCH) after the downlink transmission burst. Here, the predetermined time for confirming the channel state may be a time including a predetermined time and a CCA slot. Alternatively, the predetermined time for confirming the channel state may be 9 μs, 16 μs, 25 μs, 34 μs, or hundreds μs.

As still another example, the communication node (e.g., the terminal) may confirm the channel state during a predetermined time, immediately before transmitting the SRS. Here, the predetermined time for confirming the channel state may be a time including a predetermined time and a CCA slot. Alternatively, the predetermined time for confirming the channel state may be 9 μs, 16 μs, 25 μs, 34 μs, or hundreds μs.

As still another example, the communication node (e.g., the terminal) may confirm the channel state during a predetermined time, immediately before transmitting the PRACH. Here, the predetermined time for confirming the channel state may be a time including a predetermined time and a CCA slot. Alternatively, the predetermined time for confirming the channel state may be 9 μs, 16 μs, 25 μs, 34 μs, or hundreds μs.

The third UL method may be used for the following transmission.

For example, in the case in which a new TxOP starts from the uplink transmission burst, the third UL method may be applied to the transmission of the subframe including the first SRS, the PRACH, or the PUSCH.

As another example, the third UL method may be applied to the transmission of the SRS which is time-multiplexed with the PUSCH within one subframe.

As still another example, the third UL method may be applied to the transmission of the PRACH which is time-multiplexed with the PUSCH within one subframe.

As still another example, the third UL method may be applied to the transmission of the uplink subframe corresponding to the DCI of the (e)PDCCH including information for the uplink random channel access. In the case in which a carrier indicator field (CIF) of the DCI format 0 or the DCI format 4/4A indicates the unlicensed band cell, the number of slots for random backoff may be included in the DCI message.

As still another example, the third UL method may be applied to the transmission of the uplink subframe scheduled with a cross carrier. The terminal may start the confirmation of the channel occupancy state so that the random backoff may end at a transmission time point of the scheduled subframe. That is, the uplink transmission time point is the same as the uplink transmission time point for other cells within the same cell group, regardless of the slot value for the random backoff. The time taken to confirm the channel occupancy state may not exceed a length of one time domain symbol (e.g., SC-FDMA symbol), and in this case, the TxOP may be 1 ms. The time taken to confirm the channel occupancy state may include only the random backoff, or may include the fixed time and the random backoff. In the case in which the CIF of the DCI format 0 or the DCI format 4/4A of the (e)PDCCH indicates the unlicensed band cell, a contention window value for the random backoff may be included in the DCI message. The contention window value may be changed, depending on a result of a reception success of the previous uplink transmission burst. The contention window value included in the DCI message may be a bit string corresponding to the contention window set defined by the higher layer or the contention window set which is already defined in a standard. For example, in the case in which the contention window set is {3, 5, 7}, the contention window value included in the DCI message may include {01, 10, 11}. As another example, in the case in which the contention window set is {3, 5, 6, 7}, the contention window value included in the DCI message may include {00, 01, 10, 11}. Alternatively, an actual contention window value may also be included in the DCI message.

In the case in which the CIF of the DCI format 0 or the DCI format 4/4A of the (e)PDCCH indicates the unlicensed band cell, the number of slots for the random backoff may be included in the DCI message. This may be used so that all terminals scheduled with the same uplink subframe perform the same backoff. For example, in the case in which the contention window set is {3, 5, 7}, the contention window value included in the DCI message may include {01, 10, 11}, and '00' may be defined as transmitting the random backoff value to the terminal instead of the contention window value. In the case in which the contention window field received by the terminal is '00', the terminal may expect that the random backoff value is included in the next field.

Meanwhile, in the third UL method, the terminal may start to confirm the channel occupancy state so that the random backoff ends at a transmission start time point of the scheduled uplink transmission burst. That is, the uplink transmission time point may be the same as the uplink transmission time point for other cells within the same cell group, regardless of the slot value for the random backoff. The time taken to confirm the channel occupancy state may include only the random backoff, or may include the fixed time and the random backoff. The random backoff value may be selected within the contention window, and the contention window value may be changed depending on a result of a reception success of the previous uplink transmission burst. The terminal may determine the number of slots for the random backoff, from the contention window value included in the DCI or the actual number of slots for the random backoff. In the case in which the CIF of the DCI format 0 or the DCI format 4/4A included in the (e)PDCCH indicates the unlicensed band cell, the contention window value for the random backoff selection or an actual random backoff value may be included in the DCI message. The contention window value included in the DCI message may be a bit string corresponding to the contention window set defined by the higher layer or the contention window set which is already defined in a standard. For example, in the case in which the contention window set is {3, 5, 7}, the contention window value included in the DCI message may include {01, 10, 11}. As another example, in the case in which the contention window set is {3, 5, 6, 7}, the contention window value included in the DCI message may include {00, 01, 10, 11}. Alternatively, the contention window value and the actual random backoff value may also be simultaneously configured. For example, in the case in which the contention window set is {3, 5, 7}, the contention window value included in the DCI message may include {01, 10, 11}, and '00' may be defined as transmitting the random backoff value to the terminal instead of the contention window value. In the case in which the contention window field received by the terminal is '00', the terminal may expect that the random backoff value is included in the next field.

3. Scheduling

In the uplink transmission subframe, the scheduling for the subframe including the PUSCH may be performed by the downlink of the same cell (a self-carrier scheduling), or may be performed by another cell within a cell group (a cross-carrier scheduling).

In the self-carrier scheduling, it may be required to confirm whether the communication node (e.g., the terminal) should perform the confirmation of the channel occupancy state immediately before transmitting the corresponding subframe. In addition, a dynamic scheduling for an SRS transmission resource may be required. Such scheduling information may be included in the DCI transmitted through a PDCCH common search space of the downlink.

At least one of the following information (e.g., first information, second information, third information, fourth information, fifth information, and sixth information) may be included in the DCI transmitted through the downlink PDCCH common search space of the unlicensed band. Hereinafter, the 'corresponding subframe' refers to a (n+k)-th subframe (or a location of the (n+k)-th subframe), in relation to an n-th downlink subframe in which the DCI including at least one of the following information (e.g., the first to six information) is transmitted. For example, k may be 4.

The first information is information indicating whether or not a first subframe of the uplink transmission burst is configured in the corresponding subframe. The second information is information indicating whether or not the confirmation of the channel occupancy state is performed in the corresponding subframe immediately before the uplink subframe to be transmitted. The third information is information indicating whether or not the SRS symbol set is included in the corresponding subframe. The fourth information is information indicating whether or not the last time domain symbol (e.g., SC-FDMA symbol) of the corresponding subframe is configured for an SRS transmission. The fifth information is information indicating whether or not the last time domain symbol (e.g., SC-FDMA symbol) of the corresponding subframe is configured to confirm the channel occupancy state. The sixth information is information for triggering the SRS transmission within the corresponding subframe.

Meanwhile, in the unlicensed band cell, one downlink subframe may schedule several uplink subframes. For example, in connection with the scheduling of the uplink multiple subframes, the DCI for transmitting the scheduling information may be configured by the following methods (e.g., a method (M10), a method (M20), and a method (M30)). The DCI information for at least one of the following methods (e.g., the methods (M10 to M30)) may be included in one downlink subframe and transmitted.

The method (M10) is a method in which the base station each provides scheduling information on different uplink subframes through two or more different DCIs by using one downlink subframe. Here, the scheduling information may include a location of the first uplink subframe which may be occupied. That is, the location (e.g., X in (n+4+X)) of the first uplink subframe which may be occupied based on an n-th (here, n is a natural number) downlink subframe including the DCI may be included in the scheduling information.

The method (M20) is a method in which the base station provides scheduling information on two or more different uplink subframes through one DCI by using one downlink subframe. Here, the scheduling information may include the number of consecutive subframes including a (n+4+X)-th subframe based on the n-th downlink subframe including the DCI.

The method (M30) is a method in which the base station provides scheduling information indicated by a predetermined bit length included in the DCI, with respect to one or more scheduling information defined by the higher layer message or the RRC message.

In the method (M10), the information on the location of the subframe may be additionally included in the existing DCI format for granting the uplink subframe. Here, the information on the location of the subframe may be included in the scheduling information (scheduling information on different uplink subframes) each provided through two or more different DCIs transmitted in one downlink subframe.

In general, the DCI message (the DCI message associated with the uplink scheduling) included in the n-th subframe in the LTE system is valid for the (n+4)-th uplink subframe. The uplink subframe is defined in a frame configuration (a frame configuration of the uplink and the downlink) condition for TDD of the LTE according to the downlink location including the DCI. In the case of a configuration 0 for TDD, an uplink (UL) index field may be included in the DCI of the downlink subframe. The UL index field is used to distinguish the uplinks that are configured in two subframes having different locations through one downlink subframe.

The location of the uplink subframe according to a value of the uplink index field may be defined in advance. For example, a method for configuring information for the method (M10) is to configure the number of bits of the uplink index field to two or more. In the case in which the uplink index field of 2 bits or more is included in each DCI, the uplink index field may indicate the (n+4+X)-th subframe based on the n-th downlink subframe including the DCI. Here, X is a positive integer including 0, and may be defined according to the value of the uplink index field. The base station may include information (e.g., the value of 'UL Index field') representing the scheduled uplink subframe (e.g., a $(n+4+X_1)$-th subframe) in the first DCI, include information (e.g., the value of 'UL Index field') representing the scheduled uplink subframe (e.g., a $(n+4+X_2)$-th subframe, $X_1 \neq X_2$) in the second DCI (different from the first DCI), and transmit the first DCI and the second DCI in the downlink subframe (e.g., the n-th subframe).

For example, the 'UL Index' field may be configured of 3 bits (e.g., values of 0 to 7), as illustrated in Table 5 below, in consideration of a maximum channel occupancy time (COT) of the unlicensed band. In the case in which the value of the 'UL Index' field is 1, an interval between a start of the downlink subframe (e.g., the n-th subframe) in which the DCI is transmitted and a start of the scheduled uplink subframe (e.g., a (n+4+1)-th subframe) corresponds to (4+1) subframes.

TABLE 5

| UL Index (value) | X Value in (n + 4 + X) |
|---|---|
| 0 | 0 |
| 1 | 1 |
| 2 | 2 |
| 3 | 3 |
| 4 | 4 |

TABLE 5-continued

| UL Index (value) | X Value in (n + 4 + X) |
| --- | --- |
| 5 | 5 |
| 6 | 6 |
| 7 | 7 |

Another method for configuring information for the method (M10) is that the base station directly defines (e.g., ~seconds) the X value, as flexible timing information for the location of the scheduled (n+4+X)-th uplink subframe. The DCI for each uplink scheduling may be defined to include the X value.

In the two methods for configuring information for the method (M10) described above, multiple uplink subframes having a predetermined subframe length may be configured to be continuous, or may be configured with a gap while not be continuous.

In the method (M20), a method for configuring DCI information for scheduling the continuous multiple uplink subframes is to indicate the number of continuous subframes. Here, the number of continuous subframes may be included in the scheduling information provided through one DCI (the scheduling information on two or more different uplink subframes). For example, a first start subframe may be a (n+4)-th subframe based on the n-th downlink subframe including the DCI, or may be indicated as a value which is newly defined in the DCI.

The number of subframes which are continuously configured (or scheduled) may be newly defined in the DCI. For example, in the case in which 3 bits are used for the DCI, the number of continuous multiple uplink subframes including the (n+4)-th subframe after the n-th subframe at which the DCI is received, may be defined as in Table 6 according to a value of 'number of multiple subframes' field.

TABLE 6

| Value of 'Number of Multiple Subframes' Field | Number of Continuous Multiple Uplink Subframes Including (n + 4)-th Subframe |
| --- | --- |
| 0 | 1 |
| 1 | 2 |
| 2 | 3 |
| 3 | 4 |
| 4 | 5 |
| 5 | 6 |
| 6 | 7 |
| 7 | 8 |

Meanwhile, the DCI formats for the above mentioned method (M10) and method (M20) may be simultaneously configured in one downlink subframe. In this case, the value of 'the number of multiple subframes' field and a value of 'UL Index' field may be simultaneously included in the DCI. That is, the base station may include information representing the number of the continuously scheduled subframes and information representing the location the first uplink subframe which may be occupied in the same DCI. For example, in the case in which the value of the 'number of multiple subframes' field is a previously indicated arbitrary value, the location of the uplink subframe may be indicated through the 'UL Index' field included in the DCI. In the case in which the value of the 'number of multiple subframes' field is 0, which is a previously indicated arbitrary value, the 'number of multiple subframes' field, not the continuous multiple subframes, may be understood as the uplink scheduling information on the location of the subframe indicated by the value of the 'UL Index' field.

If the value of the 'number of multiple subframes' field is not 0, the value of the 'number of multiple subframes' field may mean the number of continuous multiple subframes including the (n+4)-th subframe. In this case, the 'UL Index' field may not be included in the DCI.

Table 7 below illustrates a case in which the 'number of multiple subframes' field having a length of 3 bits and the 'UL Index' field having a length of 3 bits are simultaneously configured in the DCI. Specifically, in Table 7, in the case in which the value of the 'number of multiple subframes' field is 1 or more, the number of the continuous uplink subframes which are additionally configured in addition to the (n+4)-th subframe may be considered. In the case in which the value of the 'number of multiple subframes' field is 0, the 'number of multiple subframes' field, not the continuous multiple subframes, means the DCI information on the scheduling of the uplink configured in the subframe indicated by the value of the 'UL Index' field included in the same DCI. That is, in the case in which the value of the 'number of multiple subframes' field is a predetermined value (e.g., 0), the location of the scheduled uplink subframe may be determined based on the value of the 'UL Index' field. In the case in which the value of the 'number of multiple subframes' field is not the predetermined value (e.g., 0), the location of the first uplink subframe among the plurality of scheduled uplink subframes may be determined (e.g., the (n+4)-th subframe) regardless of the value of the 'UL Index' field.

TABLE 7

| Value of 'Number of Multiple Subframes' Field | Meaning Represented by Value of 'Number of Multiple Subframes' Field |
| --- | --- |
| 0 | Indicate Location of Multiple Subframes, according to Value of 'UL Index Field' |
| 1 | Additionally Scheduling One Subframe After (n + 4)-th Subframe |
| 2 | Additionally Scheduling Two Subframes After (n + 4)-th Subframe |
| 3 | Additionally Scheduling Three Subframes After (n + 4)-th Subframe |
| 4 | Additionally Scheduling Four Subframes After (n + 4)-th Subframe |
| 5 | Additionally Scheduling Five Subframes After (n + 4)-th Subframe |
| 6 | Additionally Scheduling Six Subframes After (n + 4)-th Subframe |
| 7 | Additionally Scheduling Seven Subframes After (n + 4)-th Subframe |

Meanwhile, in another exemplary embodiment in which the value of the 'number of multiple subframes' field and the value of the 'UL Index' field are simultaneously included in the DCI, in the case in which the value of the 'UL Index' field is an indicated arbitrary value, the value of the 'number of multiple subframes' field may be referenced. For example, in the case in which the value of the 'UL Index' field is 0, which is the previously indicated arbitrary value, the base station may not schedule only the location of the subframe defined by the 'UL Index' as the uplink, but rather may schedule the continuous multiple subframes as the uplink, according to the value of the 'number of multiple subframes' field included in the same DCI.

Table 8 below illustrates a case in which the 'UL Index' field having a length of 3 bits and the 'number of multiple subframes' field having a length of 3 bits are simultaneously configured in one DCI. Specifically, in Table 8, in the case in which the value of the 'UL Index' field is 1 or more, the value of the 'UL Index' field may mean a value of X in (n+3+X). Here, the value of (n+3+X) means the location of a (n+3+X)-th subframe (the uplink subframe) scheduled through the DCI information included in the n-th subframe.
Table In Table 8, in the case in which the value of the 'UL Index' field is 0, an uplink resource for the continuous multiple subframes may be scheduled according to the value of the 'number of multiple subframes' field included in the same DCI. That is, in the case in which the value of the 'UL Index' field is a predetermined value (e.g., 0), the number of the continuously scheduled uplink subframes may be determined based on the value of the 'number of multiple subframes' field. In this case, the location of the first scheduled uplink subframe may be determined (e.g., the (n+4)-th subframe) regardless of the value of the 'UL Index' field. In the case in which the value of the 'UL Index' field is not the predetermined value (e.g., 0), the number of the continuously scheduled uplink subframes may be determined as 1 regardless of the value of the 'number of multiple subframes' field.

TABLE 8

| Value of 'UL Index' Field | Meaning Represented by Value of 'UL Index Field' |
| --- | --- |
| 0 | Scheduling Uplink Resource for Continuous Multiple Subframes according to Value of 'Number of Multiple Subframes' Field |
| 1 | Value of X for Location of (n + 3 + X)-th Subframe (e.g., (n + 4)-th Subframe) |
| 2 | Value of X for Location of (n + 3 + X)-th Subframe (e.g., (n + 5)-th Subframe) |
| 3 | Value of X for Location of (n + 3 + X)-th Subframe (e.g., (n + 6)-th Subframe) |
| 4 | Value of X for Location of (n + 3 + X)-th Subframe (e.g., (n + 7)-th Subframe) |
| 5 | Value of X for Location of (n + 3 + X)-th Subframe (e.g., (n + 8)-th Subframe) |
| 6 | Value of X for Location of (n + 3 + X)-th Subframe (e.g., (n + 9)-th Subframe) |
| 7 | Value of X for Location of (n + 3 + X)-th Subframe (e.g., (n + 10)-th Subframe) |

Meanwhile, the method (M30) relates to configuration information on one or scheduling information (e.g., the locations of the multiple subframes, and the like) defined by the RRC message or the higher layer message, and relates to an actual configuration instruction by a trigger field included in the DCI. For example, the higher layer message or the RRC message may include location information of the multiple subframes of the uplink which may be configured as described above.

Such location information (or configuration information) may be a reference for allowing an 'uplink multiple subframe trigger' field to be included in the DCI in the downlink subframe of the base station. For example, while the terminal is operated in the unlicensed band, each terminal may receive one or more uplink multiple subframe location information through the RRC message or the higher layer message from the base station. Such each configuration information may be mapped to information of a predetermined bit length. A field of triggering the uplink multiple subframe location information (or configuration information) (i.e., 'uplink multiple subframe Trigger' field) is included in the DCI, and a value of the 'uplink multiple subframe Trigger' field may be the same as the mapped information (e.g., information of a predetermined bit length). Each terminal may configure the uplink multiple subframes, according to the value of the 'uplink multiple subframe Trigger' field included in the DCI.

Meanwhile, in the frame structure type 3 for the unlicensed band cell, in order to guarantee the uplink transmission, the communication node may transmit the uplink through a multiple scheduling method. Here, the multiple scheduling method means that the communication node performs the scheduling with two steps.

In a primary scheduling step of the multiple scheduling method, the communication node (e.g., the base station) may transmit uplink (UL) grant DCI including information (e.g., the location and number of RBs, HARQ related information, LBT parameter, subframe location information, and the like) required to transmit the uplink.

In a secondary scheduling step of the multiple scheduling method, the communication node (e.g., the base station) may transmit scheduling information (hereinafter, referred to as 'secondary scheduling information) that determines an actual transmission time point of the uplink subframe.

Specifically, in the primary scheduling step, the communication node (e.g., the base station) may schedule at least one uplink subframe. Here, a subframe index that is actually transmitted by the communication node (e.g., the base station) may be fixed to be the same as the subframe index in the licensed band, or may be a virtual subframe index configured after the secondary scheduling step.

The terminal may receive secondary scheduling information for the secondary scheduling step through the PHICH or the common DCI of the unlicensed band cell. Specifically, the secondary scheduling information may be defined as a sequence of the PHICH, or may be transmitted through the common DCI of the unlicensed band cell. According to the secondary scheduling step, the terminal may change a LBT method, or may start the uplink subframe based on a secondary scheduling time point. The multiple scheduling method will be described with reference to FIG. 13.

FIG. 13 is a drawing illustrating a method for scheduling multiple uplinks according to an exemplary embodiment of the present invention.

Specifically, FIG. 13 illustrates a case in which the communication node (e.g., the base station) schedules (n+5)-th, (n+6)-th, and (n+7)-th uplink subframes through the uplink grant DCI in the first scheduling step. For example, the base station may transmit primary scheduling information scheduling at least one uplink subframe (e.g., (n+5)-th to (n+7)-th subframes) to the terminal in the primary downlink subframe (e.g., the n-th subframe).

In the case in which the terminal receives the PHICH or the common DCI of the downlink including the secondary scheduling information, the terminal may configure the uplink from a defined time point. Here, the defined time point may be a subframe (e.g., a (k+1)-th subframe or a (k+2)-th subframe) apart from a k-th subframe (e.g., the (n+4)-th subframe), which is the secondary downlink subframe, by an offset. For example, the defined time point may be a (n+5)-th subframe in FIG. 13. The base station may transmit the secondary scheduling information that determines the transmission time point of the uplink signal to the terminal in the secondary downlink subframe (e.g., the (n+4)-th subframe) apart from the primary downlink subframe (e.g., the n-th subframe) by a predetermined time. The terminal may transmit the uplink signal in the uplink subframe corresponding to the transmission time point determined by the secondary scheduling information among the uplink subframes (e.g., the (n+5)-th to (n+7)-th subframes) scheduled by the primary scheduling information.

Since an HARQ response using the PHICH is not performed in the frame structure type 3, in the case in which the defined sequence of the PHICH is received in a k-th subframe, the terminal may expect that the uplink transmission granted in the primary scheduling step is possible from a specific subframe (e.g., a (k+1)-th subframe or a (k+2)-th subframe).

If it is defined in the uplink grant of the primary scheduling step that the LBT of a category 4 is performed immediately before the uplink transmission, the terminal receiving the secondary scheduling information of the secondary scheduling step may change the LBT method by performing a single LBT of 25 μs instead of the LBT of the category 4. For example, the terminal receiving the secondary scheduling information may confirm an occupancy state of the unlicensed band channel for a time of 25 μs before transmitting the uplink signal, and in the case in which the occupancy state of the unlicensed band channel is a non-occupancy state, the terminal may transmit the uplink signal.

A value of the sequence of the PHICH may be determined according to the primary scheduling information (e.g., the uplink grant subframe index information) of the primary scheduling step. Therefore, in the case in which the terminal detects the sequence of the PHICH (the sequence of the PHICH for the secondary scheduling step) received in the k-th subframe (e.g., the (n+4)-th subframe), the terminal expects that the primary scheduling information of the primary scheduling step is valid, and may transmit the granted uplink from the specific subframe (e.g., the (k+1)-th subframe or the (k+2)-th subframe).

The terminal may confirm scheduling validity of the secondary scheduling step using information bit (e.g., at least 1 bit or more) included in the common DCI. For example, in a method using a toggle concept, in the case in which a bit defined to 1 in the primary scheduling step is changed to 0 in the k-th subframe (e.g., the (n+4)-th subframe), the terminal confirms that the scheduling of the secondary scheduling step is valid, and may transmit the uplink from the specific subframe (e.g., the (k+1)-th subframe or the (k+2)-th subframe).

As another example, the uplink grant DCI of the primary scheduling step does not include fixed subframe information, but may include subframe index information based on a time point at which the secondary scheduling information of the secondary scheduling step is received.

Specifically, in the primary scheduling step, the subframe index information for the uplink subframe transmission may not be included in the uplink grant DCI. This is because the actual transmission time point of the uplink subframe is varied according to a result of the channel occupancy. Therefore, in the primary scheduling step, the uplink scheduling information except for the subframe information related to the transmission time point may be transmitted to the terminal. The terminal may detect an information bit (hereinafter, referred to as 'first information bit') that informs (or indicates) the multiple scheduling method from the DCI (the DCI of the primary scheduling step) including the scheduling information. The first information bit may be included in a DCI format 0A, a DCI format 0B, a DCI format 4A, or a DCI format 4B. The first information bit may be newly defined to 1 bit, or may be defined to a value (=15) of '1111' of a 'Timing offset' field of 4 bits included in the DCI format 0A, the DCI format 0B, the DCI format 4A, or the DCI format 4B. Here, the 'Timing offset' field means a value of k in (n+4+k), which is the transmission time point of the uplink subframe scheduled by the DCI transmitted in the n-th subframe, and may have values of 0 to 15. In the case in which the information (e.g., the first information bit) indicating the multiple scheduling method is defined to 'Timing offset=1111', if the value of the 'Timing offset' field is demodulated with 1111 and the scheduling of the secondary scheduling step is detected, the terminal may transmit the uplink at a indicated time point.

1111, which is the value of the 'Timing offset' field, may be differently defined, depending on whether or not the corresponding cell supports the multiple scheduling. Whether or not the multiple scheduling is supported may be signaled through the RRC message, or the like. In the case in which the cell does not support the multiple scheduling, k may be used as k=15 in (n+4+k) of a single scheduling method. In the case in which the cell supports the multiple scheduling, k may be used as a bit that informs whether or not the DCI is the DCI for the multiple scheduling. Alternatively, in the case in which the field for informing the multiple scheduling is activated in the common DCI, if the value of the 'Timing offset' field of the DCI format 0A, the DCI format 0B, the DCI format 4A, or the DCI format 4B transmitted in the corresponding subframe is 1111, the corresponding DCI may be determined as the DCI for the multiple scheduling.

In the case in which the scheduling of the secondary scheduling step is detected, a time point at which the terminal transmits the uplink may be determined by at least one of the following three methods (e.g., a method (M100), a method (M110), and a method (M120)).

In the method (M100), the terminal transmits the uplink at a previously defined time point. Here, the previously defined time point may start from a subframe (e.g., a (m+1)-th subframe or a (m+2)-th subframe) after a predetermined time from an m-th subframe (e.g., the (n+4)-th subframe of FIG. 13) including the scheduling of the secondary scheduling step.

In the method (M200), the transmission subframe information is included in the scheduling DCI of the secondary scheduling step.

In the method (M300), the information bit(s) (e.g., the first information bit) indicating the multiple scheduling method and the 'Timing offset' information are simultaneously used. In the case in which the multiple scheduling method is defined in the scheduling of the primary scheduling step, the value of the 'Timing offset' field may be defined as indicating a value of j (e.g., j=1 or 2) of a (m+j)-th subframe, based on the m-th subframe (e.g., the (n+4)-th subframe of FIG. 13) including the scheduling of the secondary scheduling step. The information bit (e.g., the first information bit) indicating the multiple scheduling method in the primary scheduling step may be included in the common DCI, or may be included in each uplink scheduling DCI.

In the case in which the information bit (e.g., the first information bit) indicating the multiple scheduling method is defined (included) in the common DCI, a scheduling of all uplinks of the corresponding subframe may be defined as using the multiple scheduling method. This is because, when the uplink is scheduled through the existing single scheduling method while the multiple scheduling method is defined, an inter-contention may occur. Therefore, all uplinks may be scheduled through the same multiple scheduling method.

Alternatively, according to the information bit (e.g., the first information bit) indicating the multiple scheduling method, the multiple scheduling method may be applied to only a terminal of a designated terminal group. For example, in the case in which the multiple scheduling method is designated (indicated) through the first information bit of 2 bits, up to three terminal groups may be configured. In the case in which the group configuration information (e.g., the first information bit) is included in the DCI for scheduling each separate uplink, different terminal groups may be designated according to the value of the group configuration information bit (e.g., the first information bit). In the case in which the group configuration information bit (e.g., the first information bit) is detected in the scheduling of the secondary scheduling step, the terminal of the terminal group corresponding to the detected group configuration information bit (e.g., the first information bit) may transmit the uplink subframe at a designated time point. For example, in the case in which the terminal belongs to the terminal group represented by the group configuration information bit included in the secondary scheduling information, the corresponding terminal may transmit the uplink signal at a designated time point.

Unlike the method in which the groups are classified by the DCI of the separate scheduling, the terminal group information may be signaled to the terminal through the higher layer message (e.g., the RRC message). In the case in which the information bit (e.g., the group configuration information bit) of the terminal group information is included in the common DCI, it may be determined that the uplink scheduling of the terminal included in the corresponding terminal group is the multiple scheduling.

It may be expected that the DCI (the DCI for the uplink scheduling) transmitted in the subframe including the information bit (e.g., the first information bit) indicating the multiple scheduling method of all or some terminal group is scheduled through the multiple scheduling method. In the case in which the information bit (e.g., the first information bit) is included in the scheduling information of the primary scheduling step and the same information bit (e.g., the first information bit) is included in the secondary scheduling information of the secondary scheduling step, the terminal may transmit the uplink according to the scheduling information of the primary scheduling step based on the designated transmission time point. The secondary scheduling information of the secondary scheduling step may be included in the common DCI and transmitted.

Meanwhile, in the method using the PHICH, the sequence of the PHICH included in the subframe of the scheduling for the primary scheduling step may be identically transmitted in the subframe of the scheduling for the secondary scheduling step. The terminal may detect the same sequence of the PHICH to confirm the scheduling of the primary scheduling step and the scheduling of the secondary scheduling step.

Meanwhile, whether or not the multiple scheduling method is used may be signaled by the RRC message. In the case in which the multiple scheduling method is activated by the RRC message, the uplink subframe which is subsequently scheduled is defined only by the multiple scheduling method. In the case in which the multiple scheduling method is inactivated by the RRC message, the single scheduling method is enabled. In the case in which the subframe including an activation or inactivation message (e.g., the RRC message) is the n-th subframe, it may be defined that the multiple scheduling method is activated or inactivated after a (n+y)-th subframe.

Meanwhile, the LBT procedure for a channel access of the uplink scheduled through the multiple scheduling method may conform LBT parameter information signaled through the DCI format 0A, the DCI format 0B, the DCI format 4A, or the DCI format 4B. Alternatively, after the downlink subframe or the downlink transmission burst (e.g., at least one subframe) for the scheduling of the secondary scheduling step, the communication node may perform a single sensing of 25 μs, or may empty a gap of 16 μs and perform the transmission without the sensing.

Meanwhile, constraint requirements of the multiple scheduling method may be as follows.

For example, the terminal may not receive other uplink scheduling, until the terminal transmits the uplink scheduled through the multiple scheduling method. This is because the uplink transmission time point based on the multiple scheduling method is not fixed, which causes the contention with an uplink scheduling (e.g., fixed to the (n+4+k)) of the single scheduling method.

As another example, in the case in which the uplink is scheduled through the single scheduling method, the terminal may ignore or initialize the previous scheduling of the multiple scheduling method. The terminal may ignore or initialize the previous scheduling of the multiple scheduling method, based on one of the uplink transmission time point based on the single scheduling and a time point at which the single scheduling information is confirmed. This is because the case in which the terminal does not detect the secondary scheduling step of the multiple scheduling may occur. The reason is that the base station does not perform the single scheduling in a state in which the base station performs the multiple scheduling for the terminal.

As another example, in the case in which the scheduling (e.g., the secondary scheduling information) of the secondary scheduling step is not received within a predetermined time (e.g., X subframes) from the scheduling time point (e.g., the n-th subframe) of the primary scheduling step, the terminal may ignore or initialize the scheduling of the primary scheduling step. For example, in the case in which the secondary scheduling information is not received within the predetermined time (e.g., the X subframes) from the primary downlink subframe (e.g., the n-th subframe), the terminal may invalidate the primary scheduling information. Here, the value of X may be signaled to the terminal by the RRC message. Alternatively, the value of X may be fixed to a specific value in consideration of the value of the 'Timing offset' field (e.g., the value of X may be 19, from (n+4+15)). That is, the value of X may be indicated by the 'Timing offset' field (e.g., the filed representing a timing offset for the uplink transmission) included in the DCI. Alternatively, the value of X may be signaled through the scheduling of the primary scheduling step (e.g., the value of X is included in the primary scheduling information).

Meanwhile, the exemplary embodiments of the present invention are not implemented only by an apparatus and/or method described above, but may be implemented by a program performing functions, which correspond to the configuration of the exemplary embodiments of the present invention, or a recording medium on which the program is recorded. These implementations can be easily devised from the description of the above-mentioned exemplary embodiments by those skilled in the art to which the present invention pertains.

The methods according to the exemplary embodiments of the present invention may be implemented in the form of program instructions that may be executed through various computer means, and may be recorded on a computer readable medium. The computer readable medium may include one of program instructions, data files, and data structures, or a combination thereof. The program instructions recorded on the computer readable medium may be those specially designed and configured for the present invention, or may also be those known and available to those skilled in the art of computer software.

Examples of the computer readable medium may include hardware devices that are specially configured to store and perform the program instructions such as ROM, RAM, a flash memory, and the like. Examples of the program instructions may include a machine language code such as those created by a compiler, as well as a high-level code that may be executed by the computer using an interpreter, or the like. The above-mentioned hardware devices may be configured to be operated as at least one software module to perform the operations of the present invention, and vice versa.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for transmitting an uplink signal in an unlicensed band by a terminal, the method comprising:
    receiving first scheduling information in a first downlink subframe and second scheduling information in a second downlink subframe that follows the first downlink subframe, wherein the first scheduling information indicates a number of at least one scheduled uplink subframe and the second scheduling information indicates a start uplink subframe of the at least one scheduled uplink subframe; and
    transmitting the uplink signal from the start uplink subframe to a last uplink subframe that is determined by the number of the at least one scheduled uplink subframe based on indications of the first scheduling information and the second scheduling information,
    wherein the first scheduling information further includes information indicating a second to last symbol as an ending symbol of the last uplink subframe and information indicating subframe duration within which the second scheduling information is valid, and the first scheduling information further includes at least one field for each of a new data indication (NDI), a redundancy version, a modulation and coding scheme, resource block assignment, and a hybrid automatic repeat request (HARQ) number.

2. The method of claim 1, wherein the first scheduling information further includes third scheduling information for triggering a sounding reference signal (SRS) transmission.

3. The method of claim 1, wherein the first scheduling information further includes a starting location in the start uplink subframe at which the uplink signal begins to be transmitted.

4. The method of claim 3, wherein the starting location is a second symbol in the start uplink subframe.

5. A terminal for transmitting an uplink signal in an unlicensed band, the terminal comprising:
    a processor;
    a memory; and
    a transceiver,
    wherein the processor is configured to execute a program stored in the memory to perform:
        receiving, through the transceiver, first scheduling information in a first downlink subframe and second scheduling information in a second downlink subframe that is different from the first downlink subframe, wherein the first scheduling information indicates a number of at least one scheduled uplink subframe and the second scheduling information indicates a start uplink subframe of the at least one scheduled uplink subframe; and
        transmitting the uplink signal through the transceiver from the start uplink subframe to a last uplink subframe which is determined by the number of the at least one scheduled uplink subframe based on indications of the first scheduling information and the second scheduling information, and
    wherein the first scheduling information further includes information indicating a second to last symbol as an ending symbol of the last uplink subframe and information indicating subframe duration within which the second scheduling information is valid, and the first scheduling information further includes at least one field for each of a new data indication (NDI), a redundancy version, a modulation and coding scheme, resource block assignment, and a hybrid automatic repeat request (HARQ) number.

6. The terminal of claim 5, wherein the first scheduling information further includes third scheduling information for triggering a sounding reference signal (SRS) transmission.

7. The terminal of claim 5, wherein the first scheduling information further includes a starting location in the start uplink subframe at which the uplink signal begins to be transmitted.

8. The terminal of claim 7, wherein the starting location is a second symbol in the start uplink subframe.

* * * * *